United States Patent
Hagedorn et al.

(10) Patent No.: US 10,710,473 B2
(45) Date of Patent: Jul. 14, 2020

(54) APPARATUS INCLUDING A STORAGE AND SEATING MODULE PROVIDING ENHANCED VERSATILITY

(71) Applicant: FORD GLOBAL TECHNOLOGIES, LLC, Dearborn, MI (US)

(72) Inventors: Gregory Horace Hagedorn, Bloomfield Hills, MI (US); Johnathan Andrew Line, Northville, MI (US); Jimmy Moua, Canton, MI (US); Adam Ewel, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 16/161,289

(22) Filed: Oct. 16, 2018

(65) Prior Publication Data
US 2020/0114785 A1 Apr. 16, 2020

(51) Int. Cl.
| | | |
|---|---|---|
| *B60N 2/02* | (2006.01) | |
| *B60N 2/01* | (2006.01) | |
| *B60N 2/015* | (2006.01) | |
| *B60R 7/04* | (2006.01) | |
| *B60R 11/00* | (2006.01) | |
| *B60N 2/14* | (2006.01) | |
| *B60R 11/02* | (2006.01) | |

(Continued)

(52) U.S. Cl.
CPC ........... *B60N 2/0292* (2013.01); *B60N 2/143* (2013.01); *B60N 2/01* (2013.01); *B60N 2/015* (2013.01); *B60N 2/0244* (2013.01); *B60N 2/06* (2013.01); *B60N 2/203* (2013.01); *B60N 2/24* (2013.01); *B60R 7/04* (2013.01); *B60R 11/0229* (2013.01); *B60R 2011/0007* (2013.01); *B60R 2011/0082* (2013.01); *B60R 2011/0084* (2013.01)

(58) Field of Classification Search
CPC .......... B60N 2/005; B60N 2/06; B60N 2/143; B60N 2/30; B60N 2/3077; B60N 2/32; B60N 2002/022; B60N 2/0292; B60N 2/01; B60N 2/015; B60N 2/24; B60N 2/203; B60R 13/0262; B60R 7/04; B60R 7/043; B60R 2011/0007; B60R 11/0029; B60R 2011/0082; B60R 2011/0084
See application file for complete search history.

(56) References Cited

U.S. PATENT DOCUMENTS

| | | | |
|---|---|---|---|
| 5,511,853 A | | 4/1996 | Wallis |
| 5,636,884 A | * | 6/1997 | Ladetto .................. B60N 2/06 296/65.09 |

(Continued)

FOREIGN PATENT DOCUMENTS

DE      10334999 A1     2/2005

OTHER PUBLICATIONS

English Machine Translation of DE10334999A1 dated Feb. 24, 2005.

(Continued)

*Primary Examiner* — Gregory A Blankenship
(74) *Attorney, Agent, or Firm* — David Coppiellie; King & Schickli, PLLC

(57) ABSTRACT

An apparatus includes a track, a carriage displaceable along the track, a storage and seating module and a swivel. The swivel connects the storage and seating module to the carriage. The swivel allows the storage and seating module to be selectively oriented in a first position or a second position on the carriage.

20 Claims, 32 Drawing Sheets

(51) Int. Cl.
*B60N 2/06* (2006.01)
*B60N 2/20* (2006.01)
*B60N 2/24* (2006.01)

(56) References Cited

U.S. PATENT DOCUMENTS

| | | | | |
|---|---|---|---|---|
| 6,264,261 B1 * | 7/2001 | Krafcik | ................ | B60N 2/2839 |
| | | | | 296/37.8 |
| 7,883,146 B2 | 2/2011 | Saberan et al. | | |
| 9,096,150 B2 | 8/2015 | Cuddihy et al. | | |
| 2002/0140246 A1 * | 10/2002 | Worrell | ................... | B60N 2/26 |
| | | | | 296/37.8 |
| 2003/0234550 A1 | 12/2003 | Brooks et al. | | |
| 2004/0056500 A1 * | 3/2004 | Kayumi | ................... | B60N 2/01 |
| | | | | 296/37.15 |
| 2004/0056521 A1 * | 3/2004 | Kayumi | ................... | B60N 2/01 |
| | | | | 297/334 |
| 2005/0253433 A1 * | 11/2005 | Brown | ................. | B60N 2/3011 |
| | | | | 297/283.3 |
| 2008/0303302 A1 * | 12/2008 | Sturt | ........................ | B60R 7/04 |
| | | | | 296/24.34 |
| 2010/0090510 A1 * | 4/2010 | Kyogoku | ............. | B60N 2/3038 |
| | | | | 297/256.1 |
| 2015/0137572 A1 * | 5/2015 | Auger | .................... | B60N 2/062 |
| | | | | 297/344.21 |
| 2016/0046240 A1 * | 2/2016 | Lara sandoval | ......... | B60N 2/02 |
| | | | | 297/188.13 |
| 2017/0008439 A1 * | 1/2017 | DiFiore | ................... | B60R 11/00 |
| 2018/0178733 A1 | 6/2018 | Faruque et al. | | |
| 2018/0265010 A1 * | 9/2018 | Line | ........................ | B60N 2/22 |
| 2019/0031114 A1 * | 1/2019 | Line | ........................ | B60N 2/206 |

OTHER PUBLICATIONS

11" Truck/SUV Center Console; Cerullo Performance Seating; http://www.cerullo.com/11-truck-suv; p. 1 of 1, printed Oct. 15, 2018.

* cited by examiner

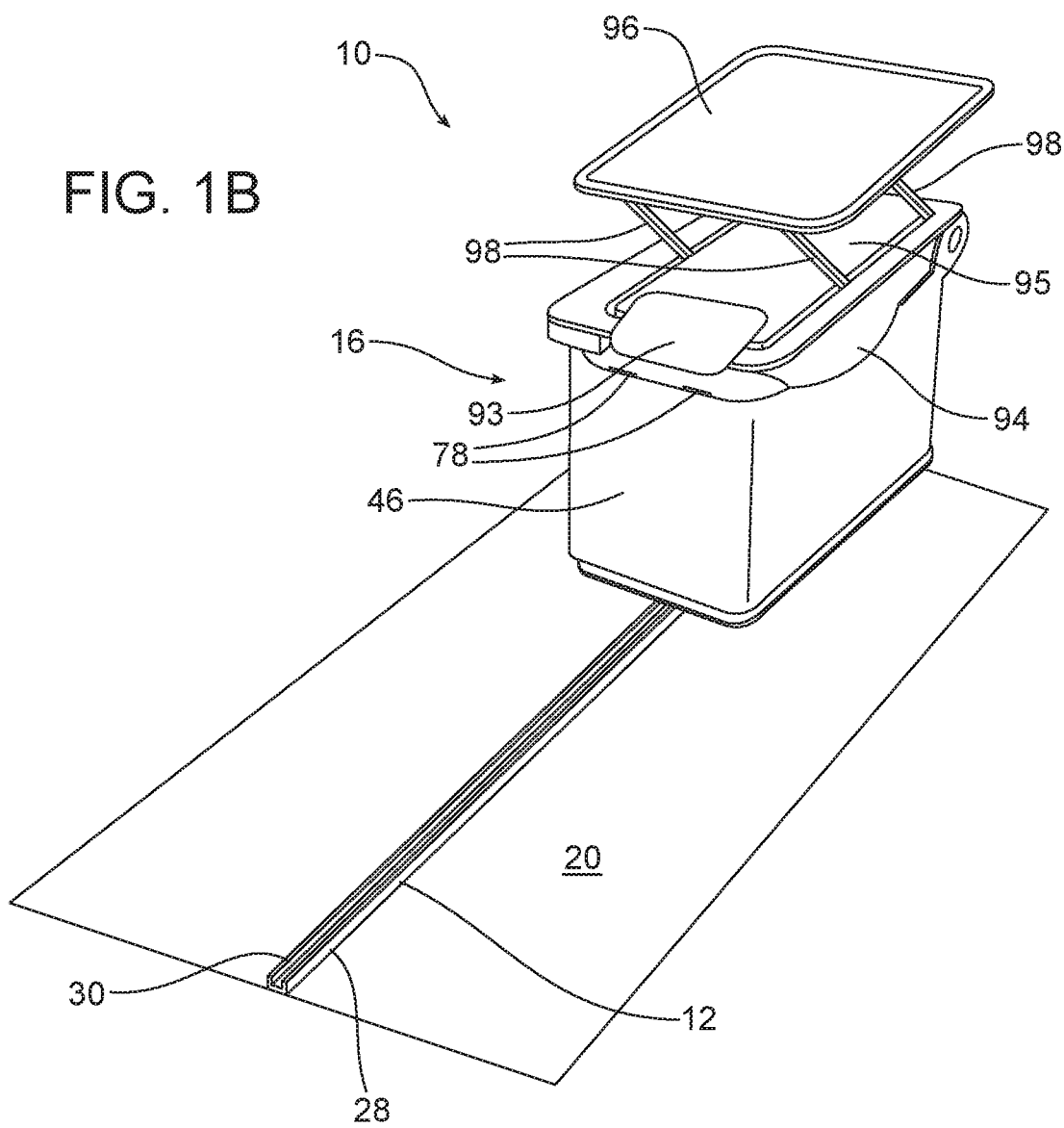

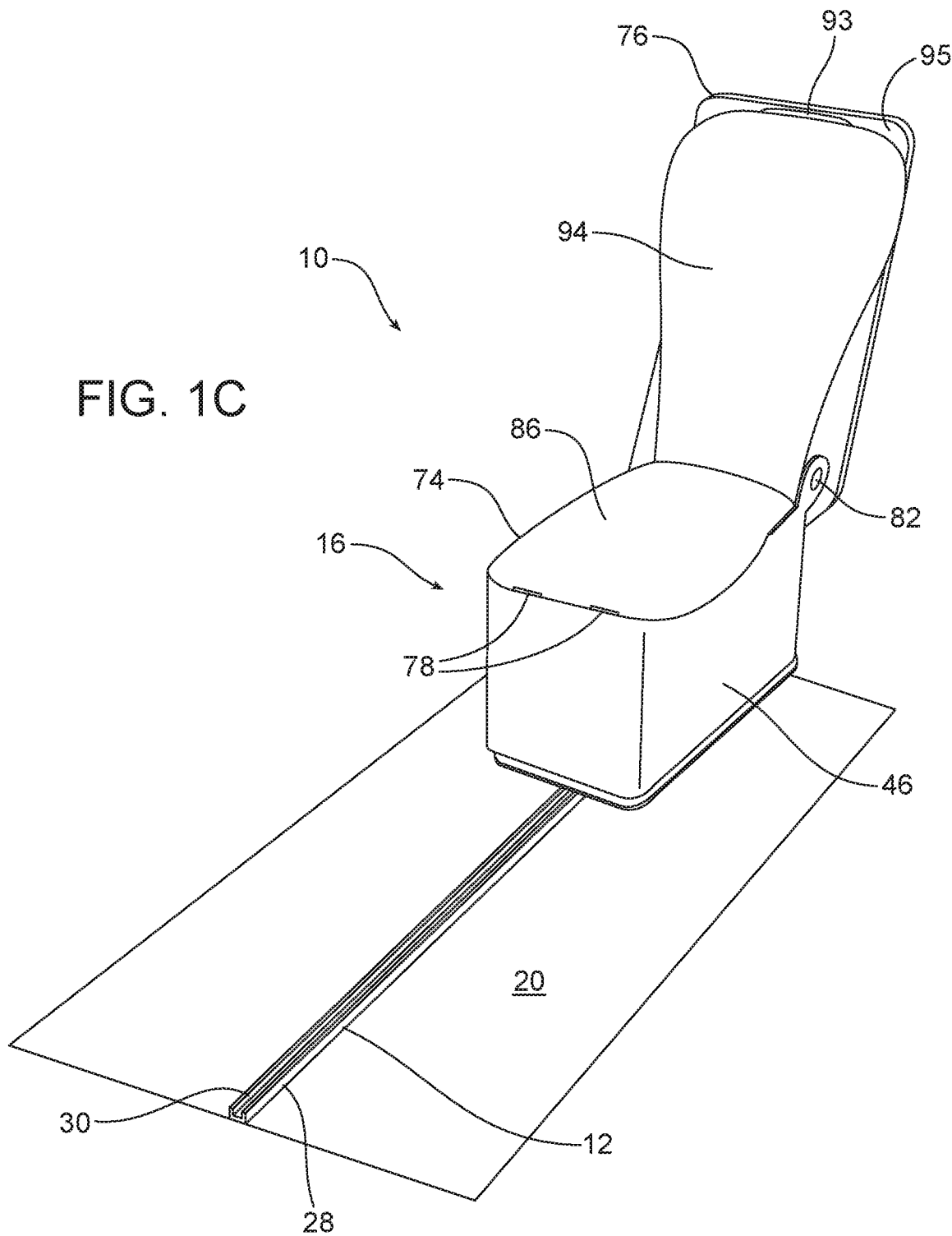

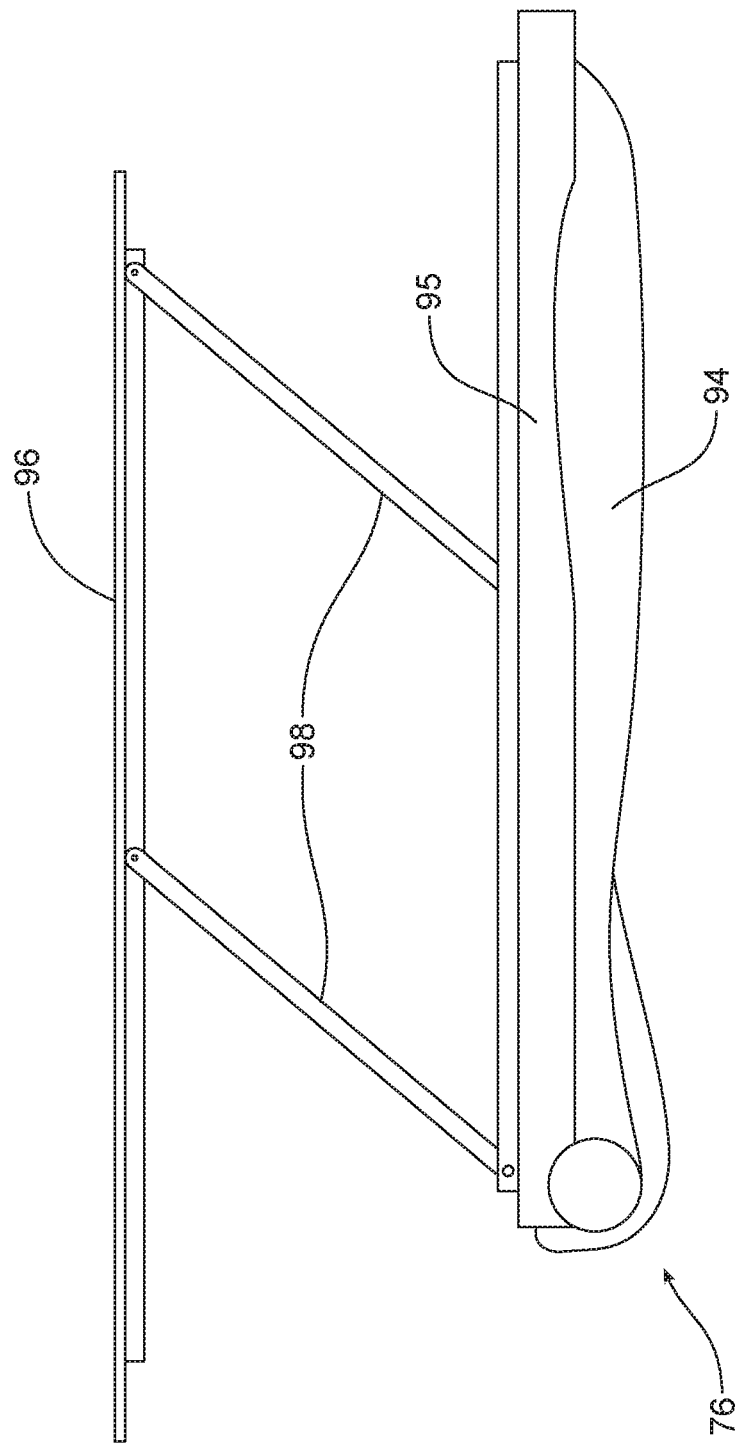

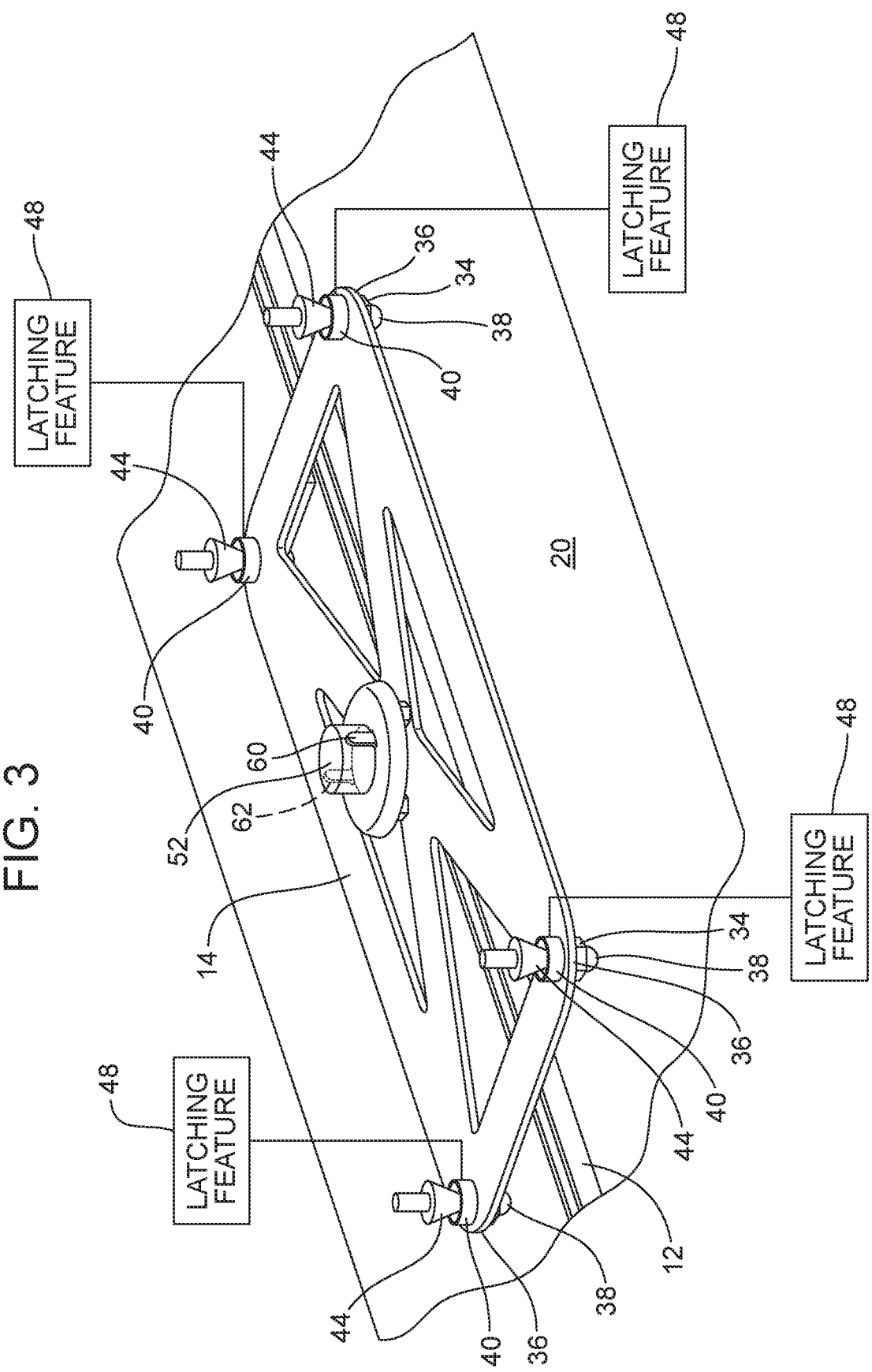

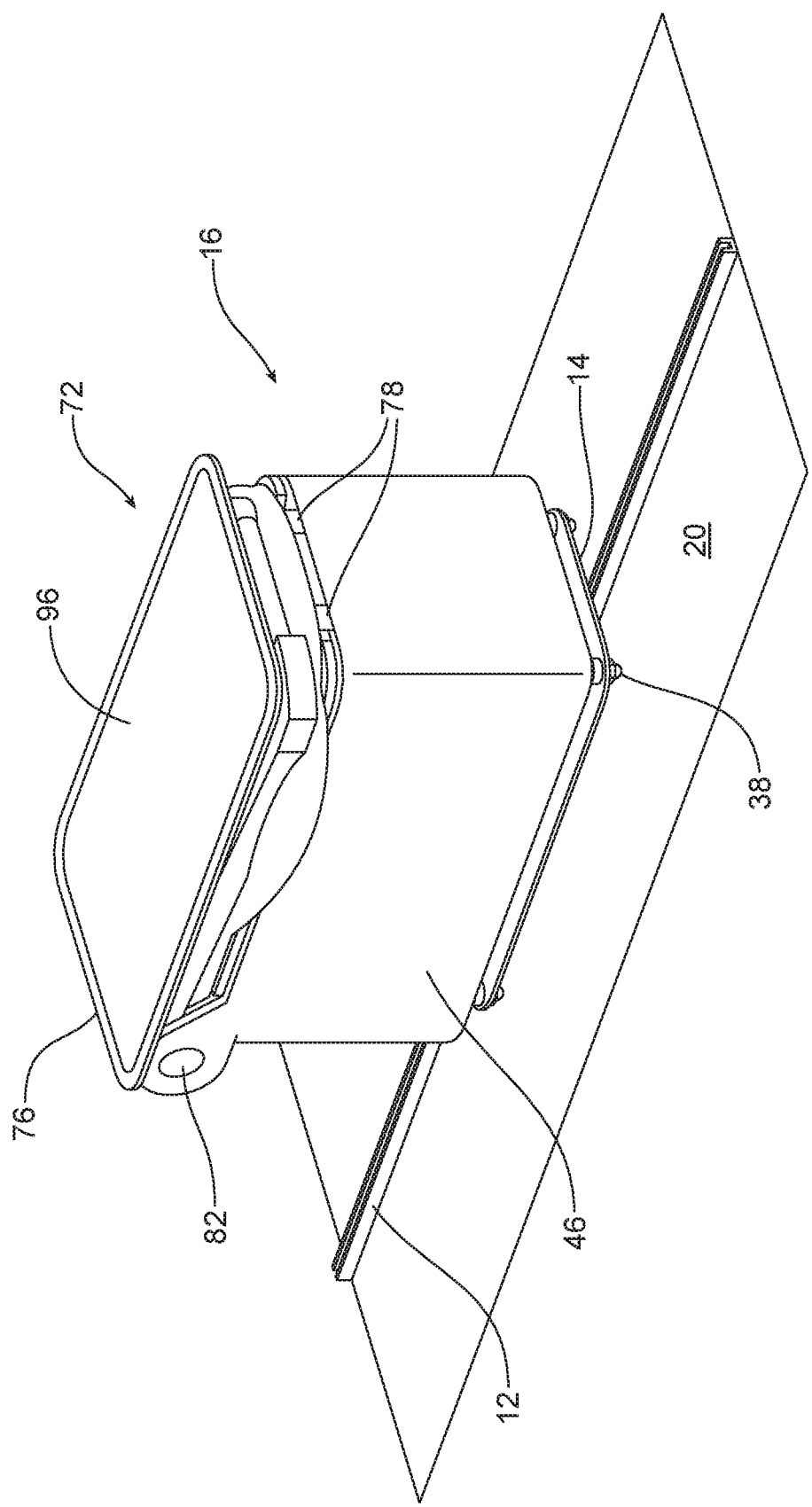

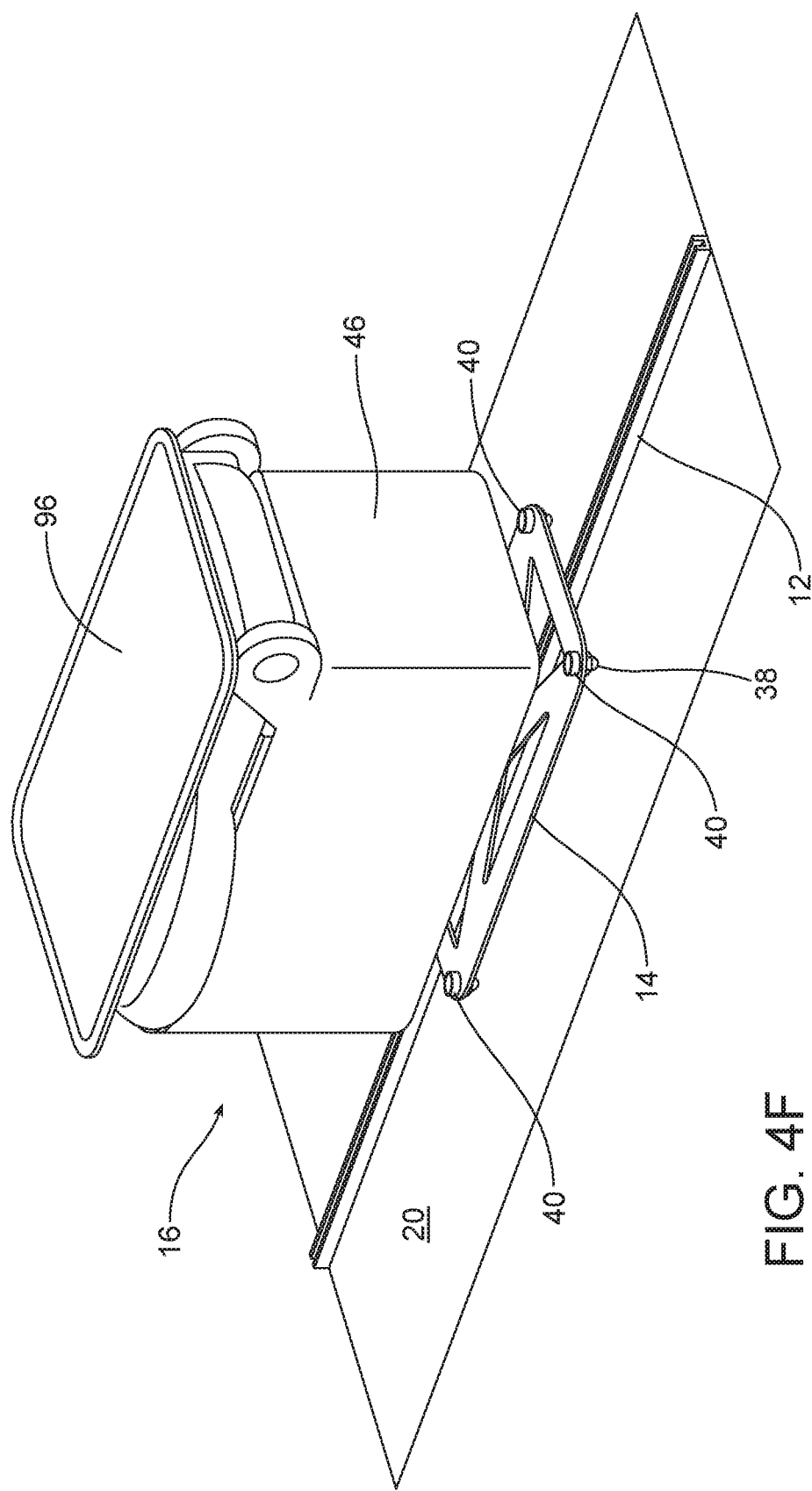

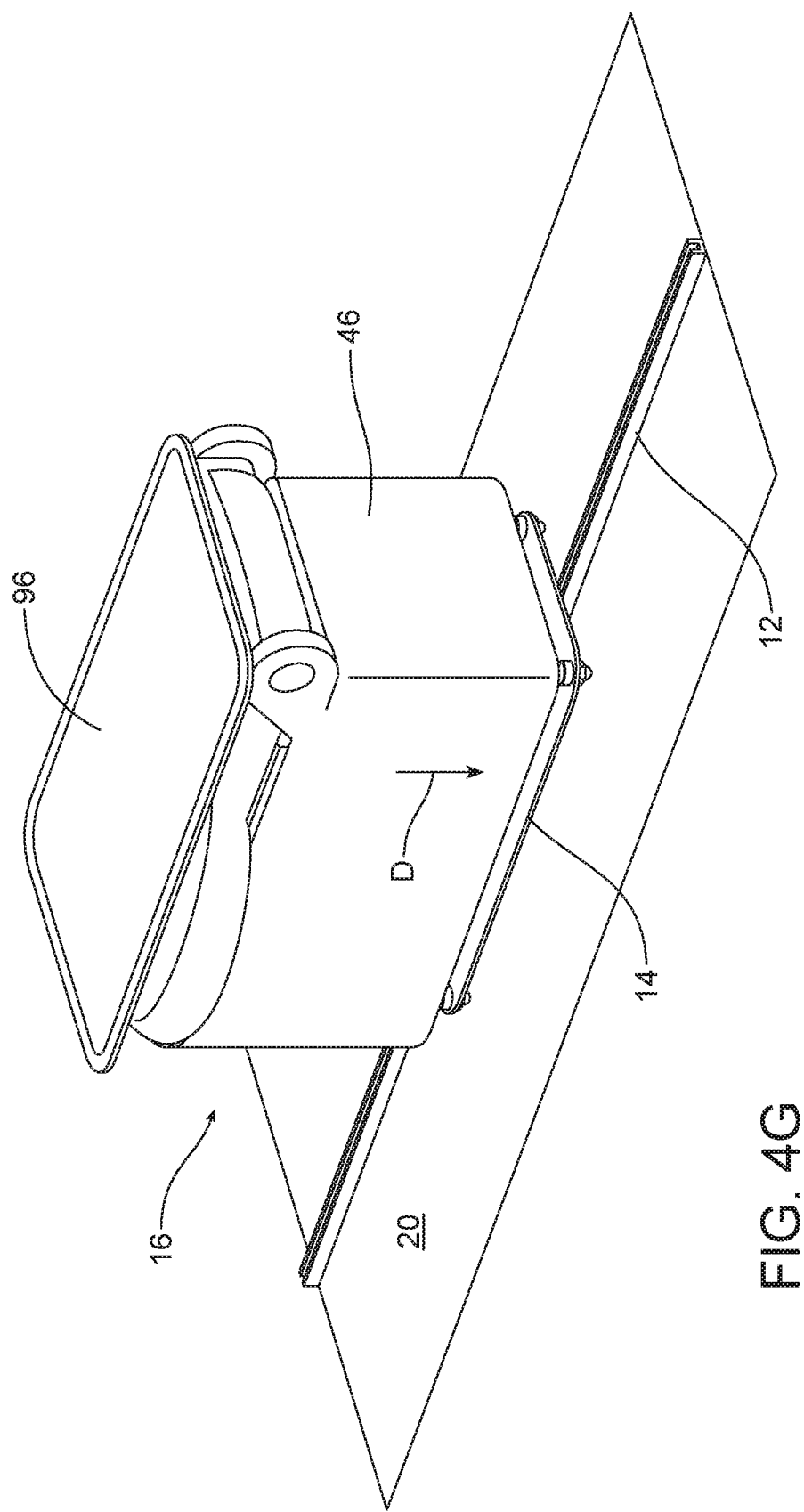

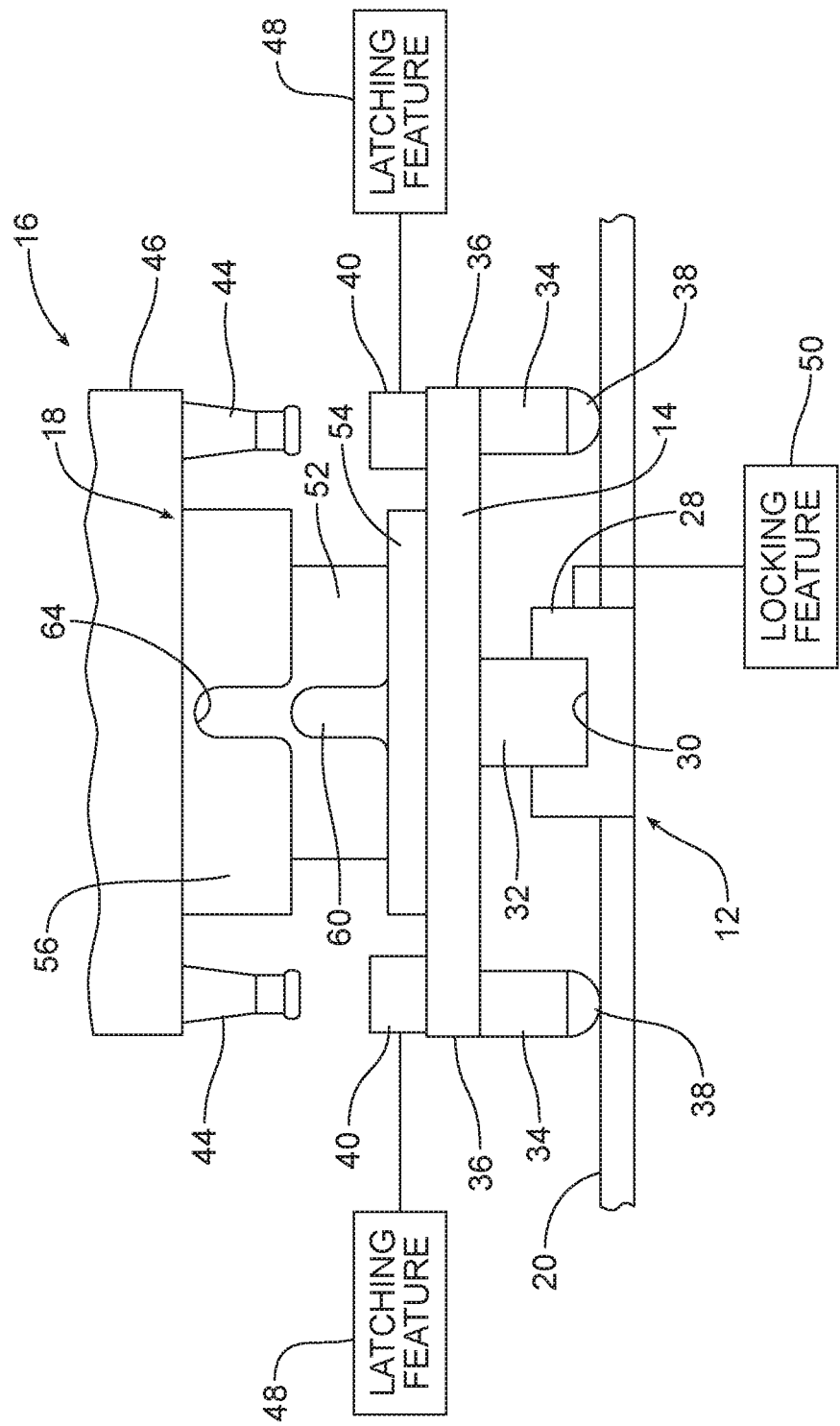

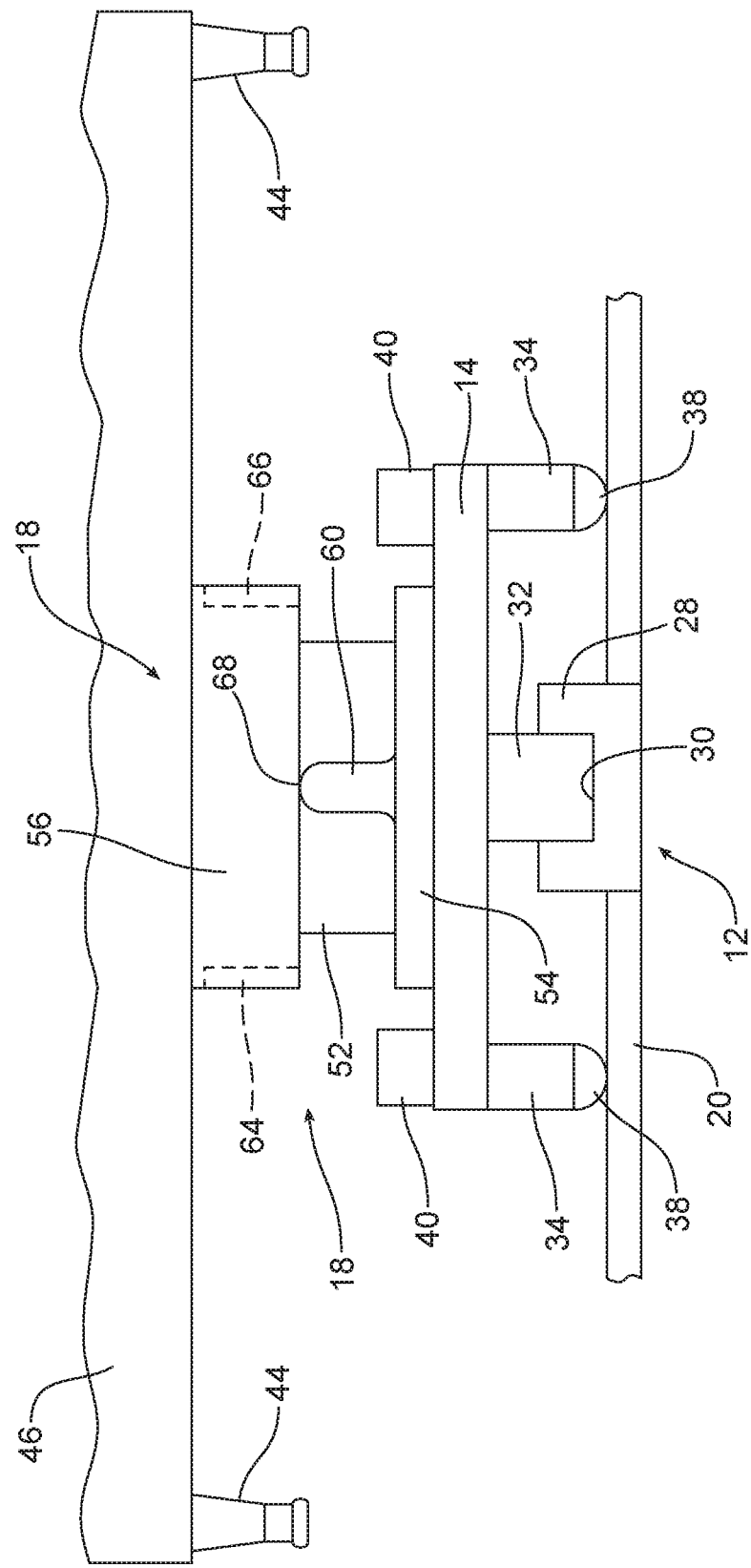

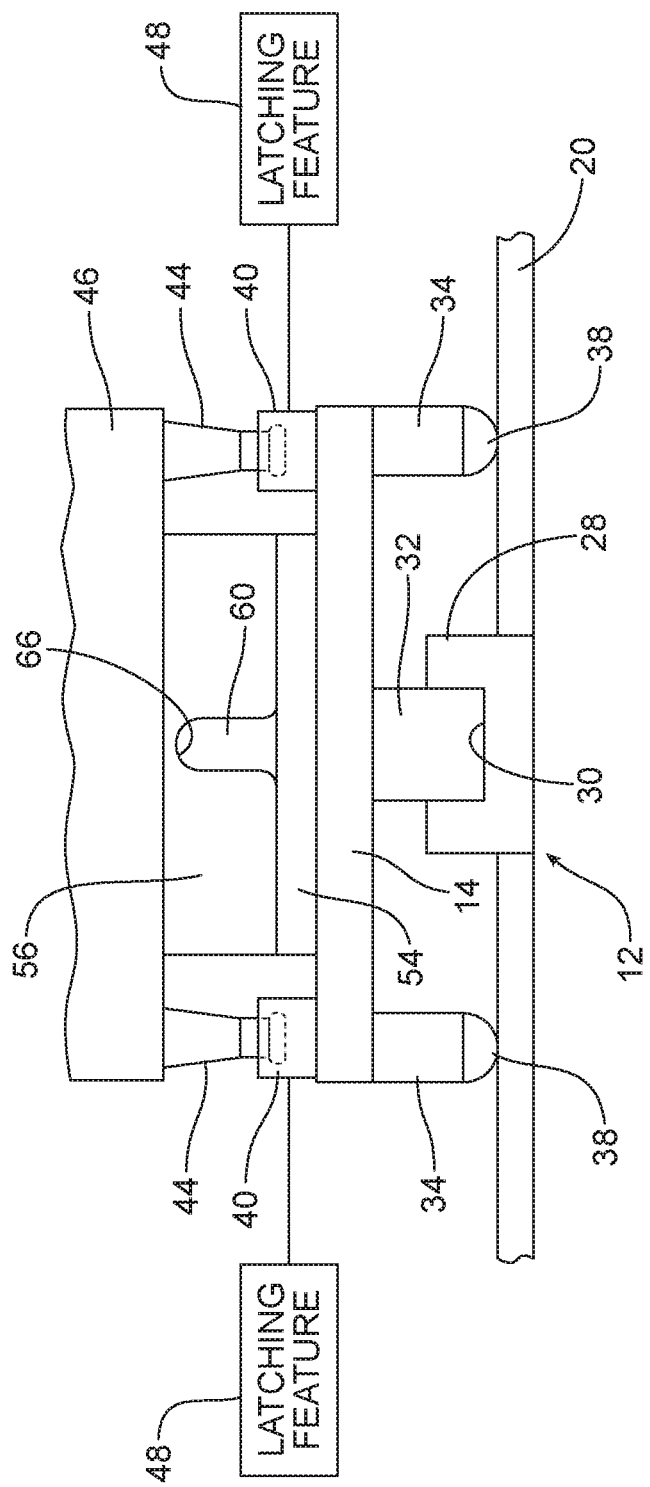

APPARATUS INCLUDING A STORAGE AND SEATING MODULE PROVIDING ENHANCED VERSATILITY

TECHNICAL FIELD

This document relates generally to the motor vehicle equipment field and, more particularly, to a new and improved apparatus including a storage and seating module that is positionable and configurable to provide for enhanced versatility to more efficiently and effectively meet the needs of a user in a large number of different capacities.

BACKGROUND

This document relates to a new and improved apparatus for configuring the passenger compartment of a motor vehicle in a wide range of configurations particularly suited to meet the ever-changing needs of the user. Advantageously, the apparatus has sufficient versatility to provide more efficient and effective utilization of the passenger cabin under substantially any foreseeable operating conditions. This is true whether or not the apparatus needs to accommodate an extra passenger within any of the standard seating rows or at an intermediate position. The apparatus also allows the extra seating to be forward facing or rearward facing depending on how the user wishes to configure the passenger compartment. The apparatus may also be configured as a work station to provide a table top for reading or writing or a conveniently located view screen such as a touch screen having internet connectability. The apparatus also provides additional, conveniently located storage space and is easily displaceable from position to position within the motor vehicle by means of a track.

Advantageously, the apparatus enhances the versatility of the passenger compartment for many wide ranging applications and is very easy to utilize. Accordingly, the apparatus enhances customer satisfaction with the motor vehicle and represents a significant advance in the art.

SUMMARY

In accordance with the purposes and benefits as described herein, a new and improved apparatus is provided. That apparatus comprises a track, a carriage displaceable along that track, a storage and seating module and a swivel connecting the storage and seating module to the carriage. Advantageously, the apparatus allows the storage and seating module to be selectively oriented in a first position or a second position on the carriage.

The storage and seating module may include a base having a storage compartment. Further, the storage and seating module may include a configurable feature carried on the base. That configurable feature may include a first section and a second section. The first section may be connected by a first pivot to a first end of the base while the second section may be connected by a second pivot to a second end of the base.

The first section may include a seat bottom cushion on a first face and a cup holder and a view screen on a second face. The second section may include a seat back cushion on a first side and a table top or surface on a second side. The first section may be displaceable between a first home position overlying and closing the storage compartment in the base and a first deployed position projecting upwardly from the first end of the base. The seat bottom cushion may be oriented upward from the base when the first section is in the first home position.

The second section may be displaceable between a second home position overlying and covering the base and a second deployed position projecting upwardly from the second end of the base. The table top is oriented upward when the second section is in the second home position. Further, the second section overlies the first section when the first section is in the first home position and the second section is in the second home position.

At least a portion of the table top may be supported on a linkage and is displaceable between a lowered position and a raised position. In one possible embodiment that linkage is a four bar linkage.

The view screen may be connected by a hinge to the first section. This allows one to displace the view screen between a stored position and an extended position.

The track upon which the carriage is displaced may have a first end in a first row of seating in the motor vehicle and a second end in the second row of seating in the motor vehicle. The storage and seating module may be selectively displaceable between a first seating position in the first row of seating, a second seating position in the second row of seating and a third seating position intermediate the first row of seating and the second row of seating.

The swivel upon which the storage and seating module is connected to the carriage may include (a) a mounting post and a cam carried on the carriage and (b) a post receiver carried on the base. The cam may include a first finger and a second finger. The post receiver may include a first finger receiver and a second finger receiver. The first finger is received in the first finger receiver and the second finger is received in the second finger receiver when the storage and seating module is in the first position. In contrast, the first finger is received in the second finger receiver and the second finger is received in the first finger receiver when the storage and seating module is in the second position.

The storage and seating module may include a plurality of legs and the carriage may include a plurality of leg receivers. When the storage and seating module is in the first position or the second position, the plurality of legs are received and held in the plurality of leg receivers so that the storage and seating module is properly seated and fixed to the carriage. A latching feature may be provided to releasably secure the plurality of legs in the plurality of leg receivers. A locking feature may be provided to secure the carriage in a selected position along the track.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof.

FIG. 1B is a similar perspective view of the storage and seating module in a second configuration wherein the table top has been displaced into a raised position.

FIG. 1C is a perspective view of the storage and seating module wherein the second section thereof has been pivoted open into a seat configuration.

FIGS. 2A and 2B are respective side and end elevational views illustrating the linkage that supports the table top in a raised position.

FIG. 3 is a detailed perspective view illustrating the carriage that supports the storage and seating module and is displaceable along the underlying track. As illustrated, the locking pins of the base (not shown) are received and locked in the locking pin receivers carried on the carriage.

FIGS. 4A-4G are a series of perspective views illustrating the operation of the swivel that connects the storage and seating module to the carriage and allows the storage and seating module to be displaced between a first position (illustrated in FIG. 4A) and a second position (illustrated in FIG. 4G) on the carriage.

More particularly, FIG. 5A illustrates the lifting of the storage and seating module with respect to the carriage.

FIG. 5B illustrates the collar engaging the top edge of a finger as the storage and seating module is being rotated between the first position and the second position.

Figure 5C:
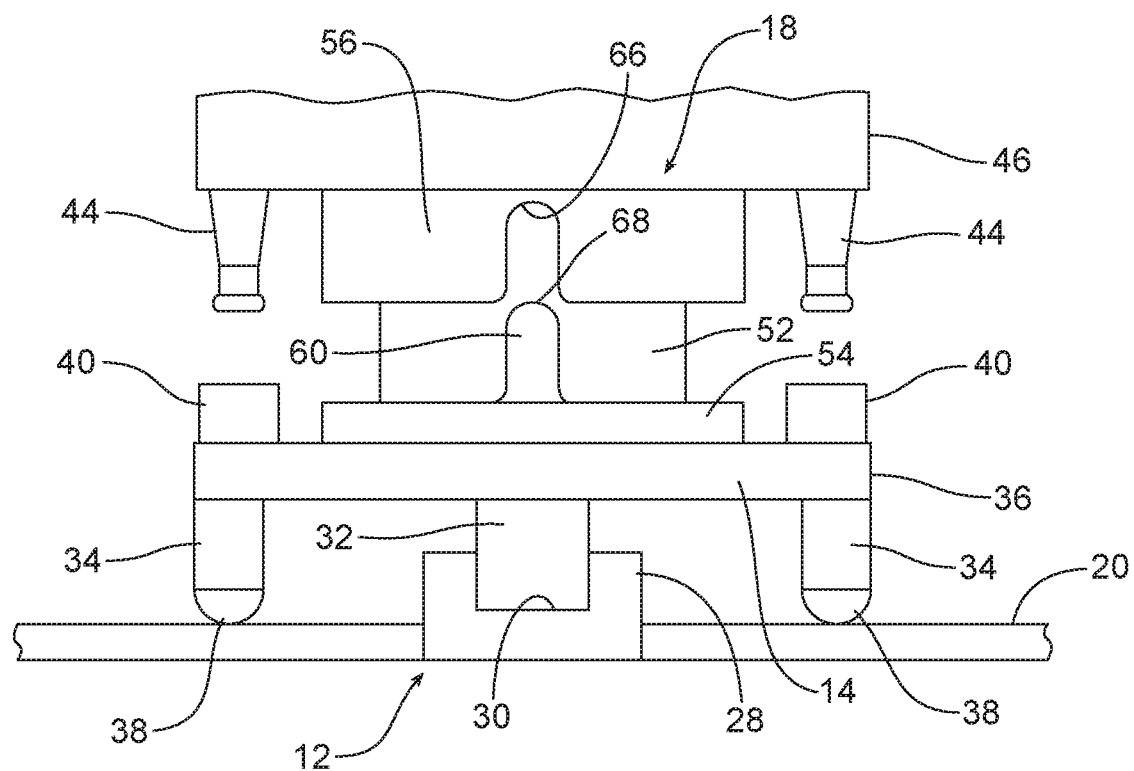
FIG. 5A is a detailed schematic view illustrating the structural details of the swivel including the cooperating mounting post, having first and second fingers, carried on the carriage and the collar, having first and second finger receivers, carried on the base of the storage and seating module.

FIG. 5C illustrates the realignment of the storage and seating module finger receivers with the fingers once the storage and seating module has been rotated through 180 degrees.

FIG. 5D illustrates the lowering of the storage and seating module back onto the carriage with the fingers received in the finger receivers so as to prevent further rotation of the storage and seating module with respect to the carriage.

Figure 6:
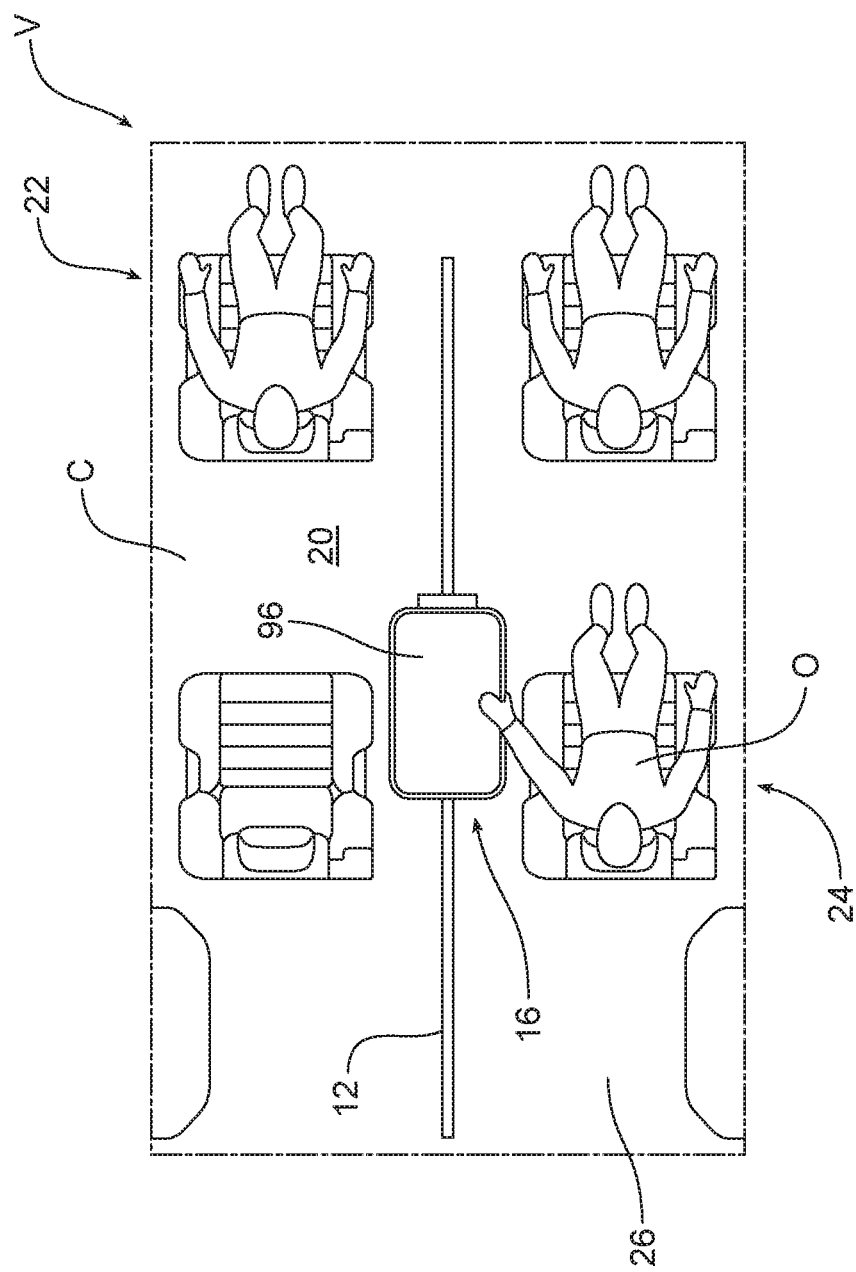

FIG. 6 is a schematic overhead view of the passenger compartment of a motor vehicle illustrating the storage and seating module of the apparatus in a position between the seats of the second row of the motor vehicle and the table top oriented upward.

Figure 7:
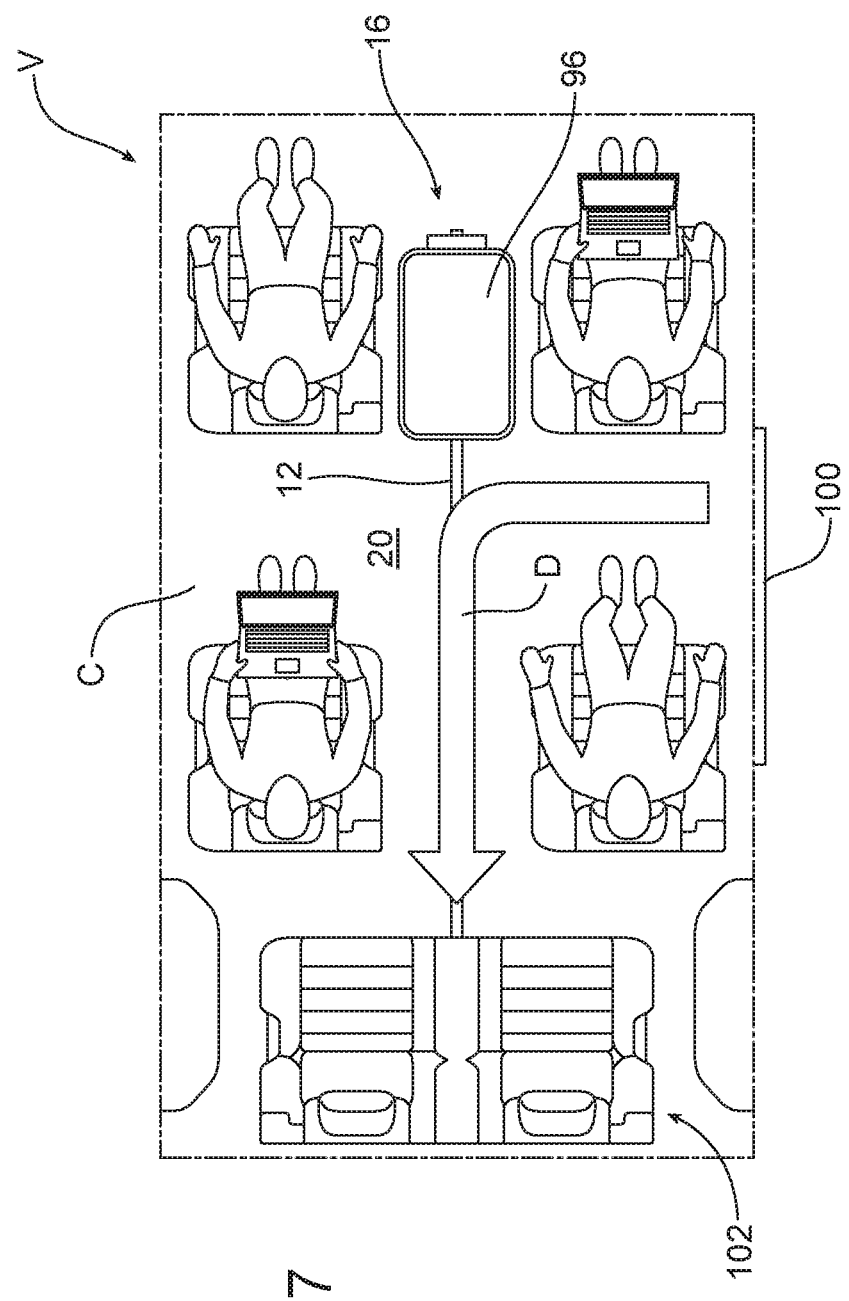

FIG. 7 is a view similar to FIG. 6 but illustrating the storage and seating module repositioned along the track between the seats of the first row in order to allow ingress from a side door and movement between the seats of the second row to a third row seat located at the rear of the motor vehicle.

Figure 8:
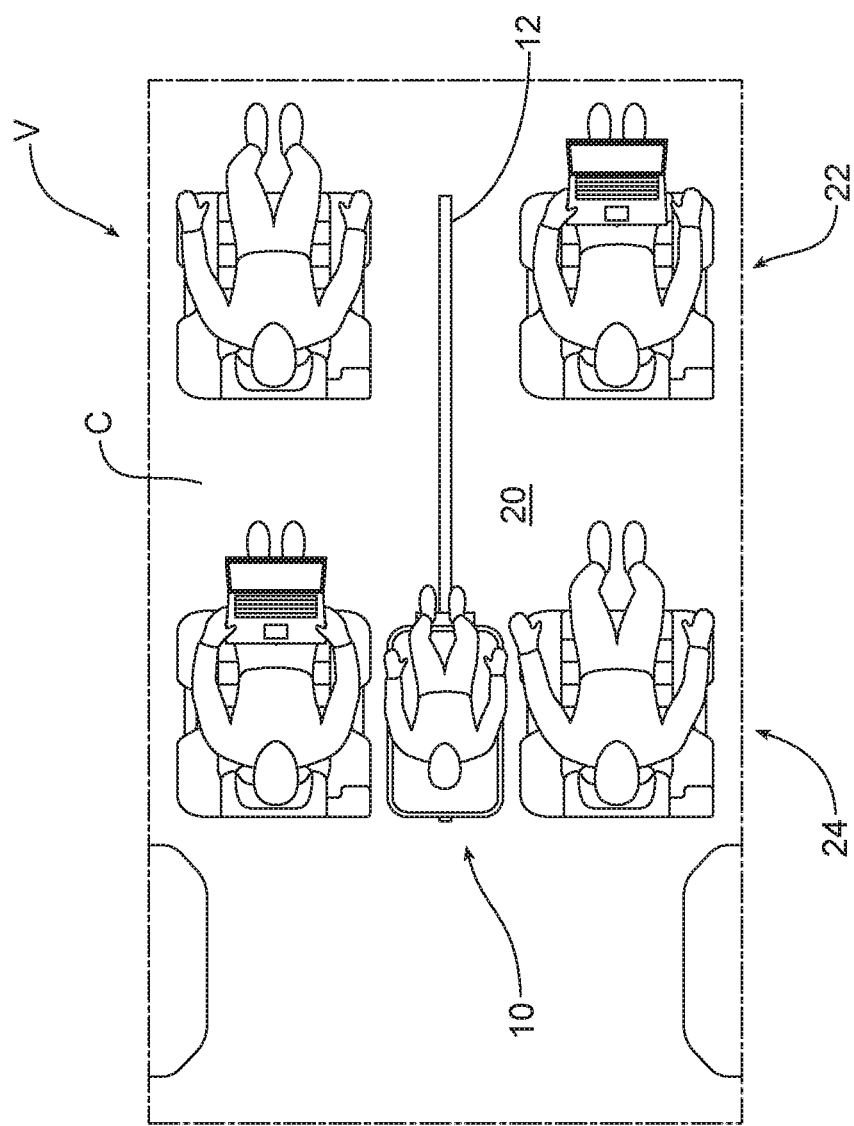

FIG. 8 is a top plan view of the passenger cabin of a motor vehicle wherein the storage and seating module is positioned along the track between the seats of the second row and configured to provide an additional third seating position within the second row seating.

Figure 9:
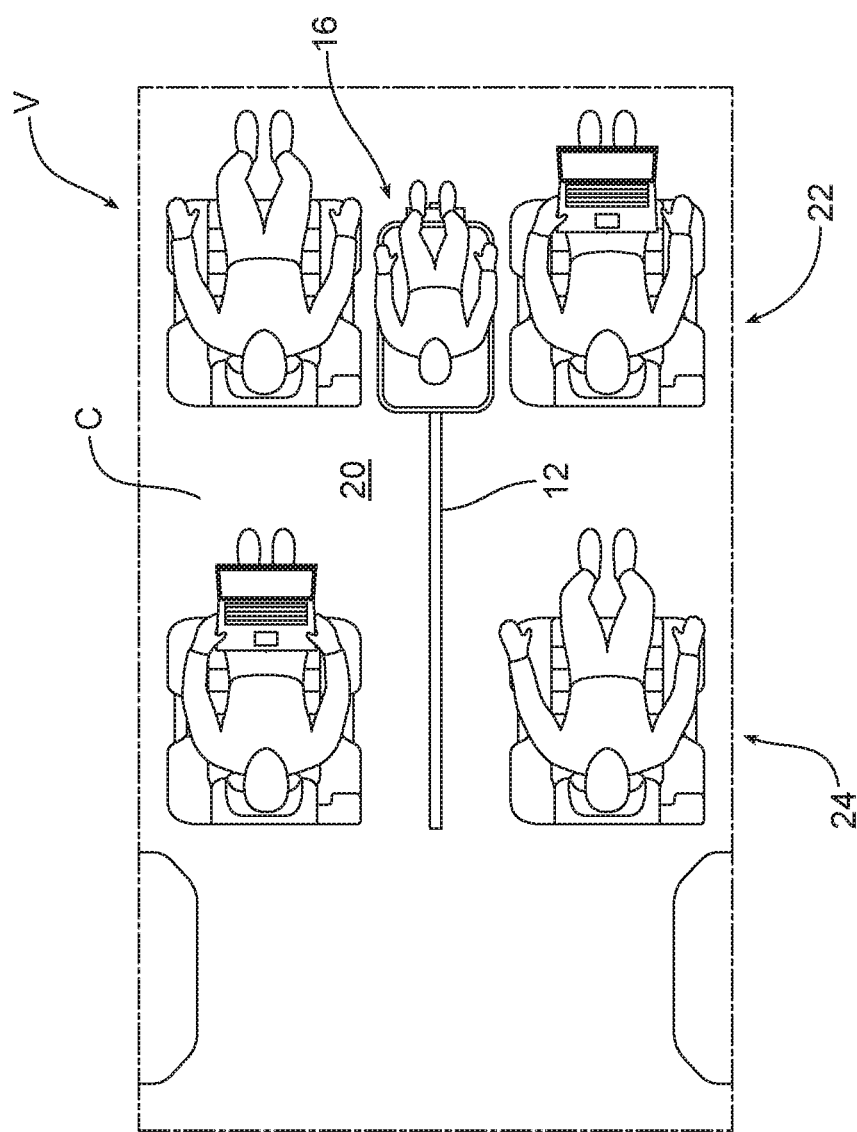

FIG. 9 is another top plan view of the passenger cabin of a motor vehicle wherein the storage and seating module has been positioned between the seats of the front row and is in a seating configuration facing motor vehicle forward.

Figure 10:
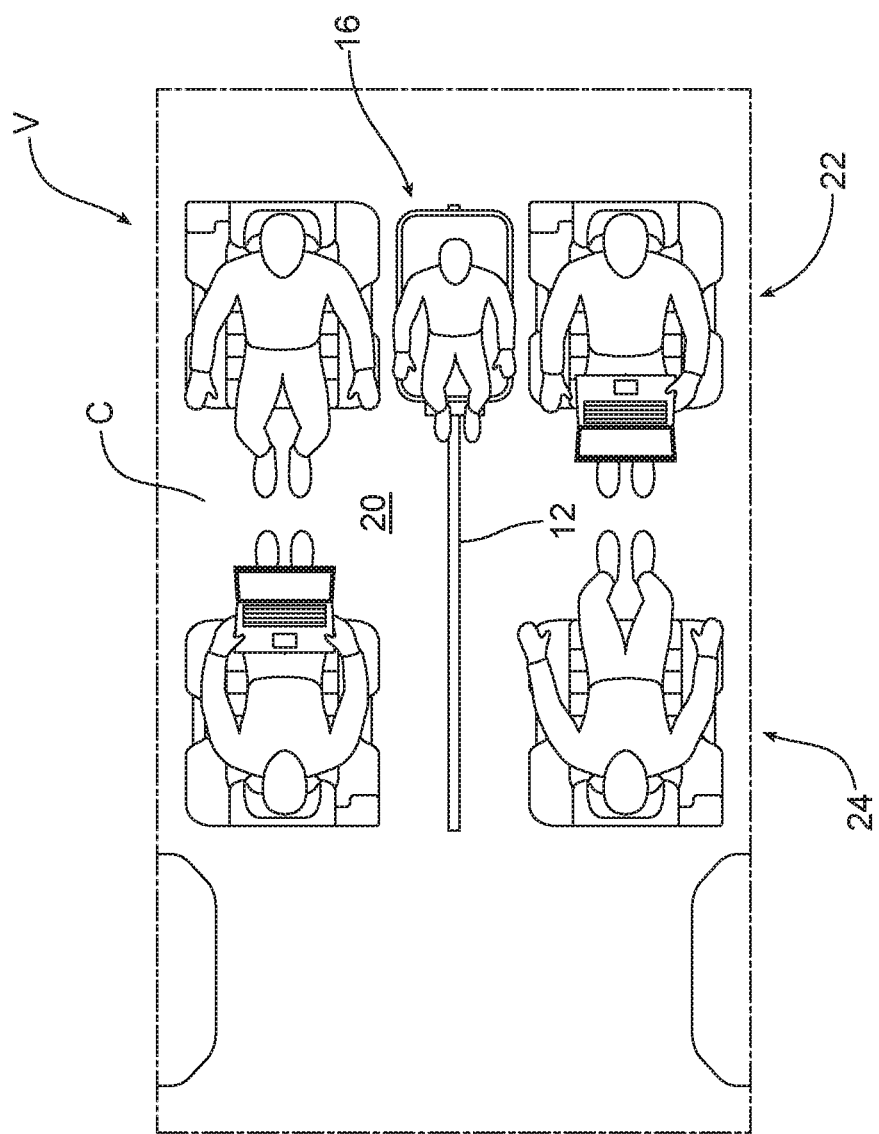

FIG. 10 is a view similar to FIG. 9 but illustrating the standard front row seats and the storage and seating module therebetween all oriented to provide seating facing motor vehicle rearward.

Figure 11:
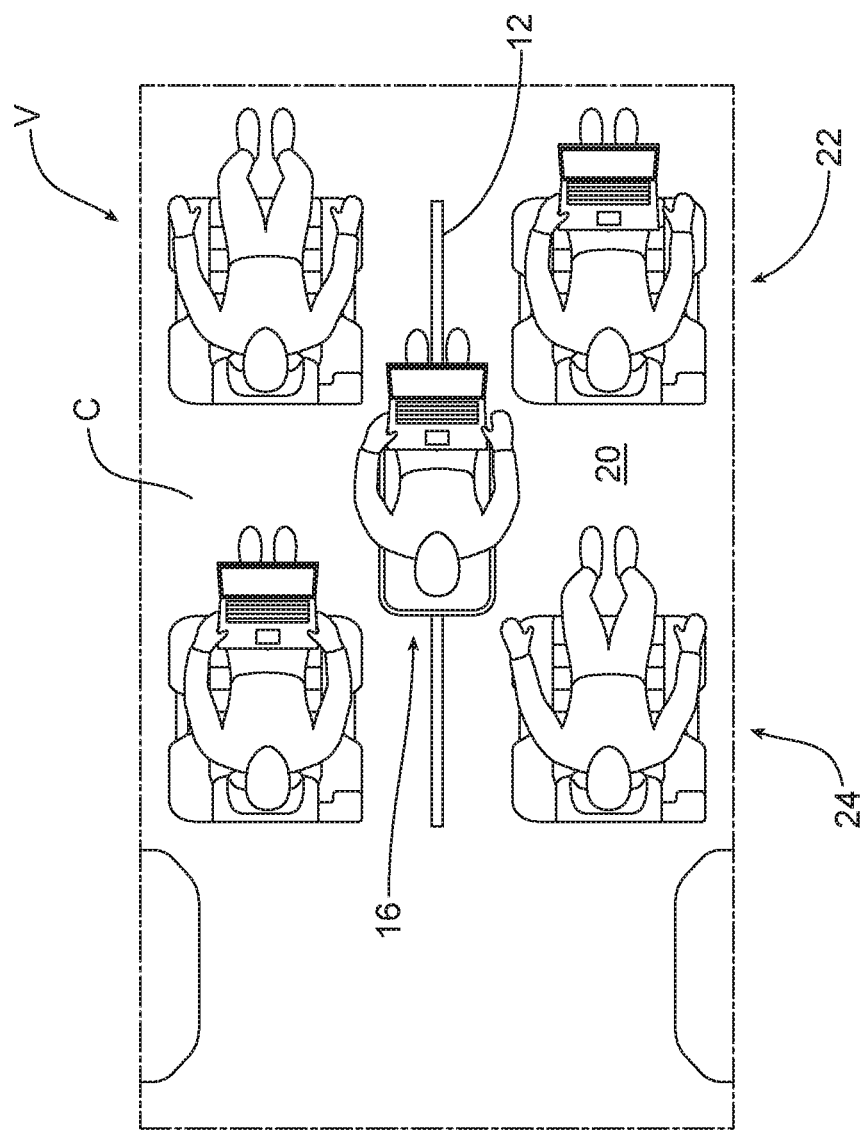

FIG. 11 is a top plan view of the passenger cabin of the motor vehicle wherein the storage and seating module is positioned in an intermediate position and configured to provide an additional seat between the first seating row and the second seating row.

Figure 12:
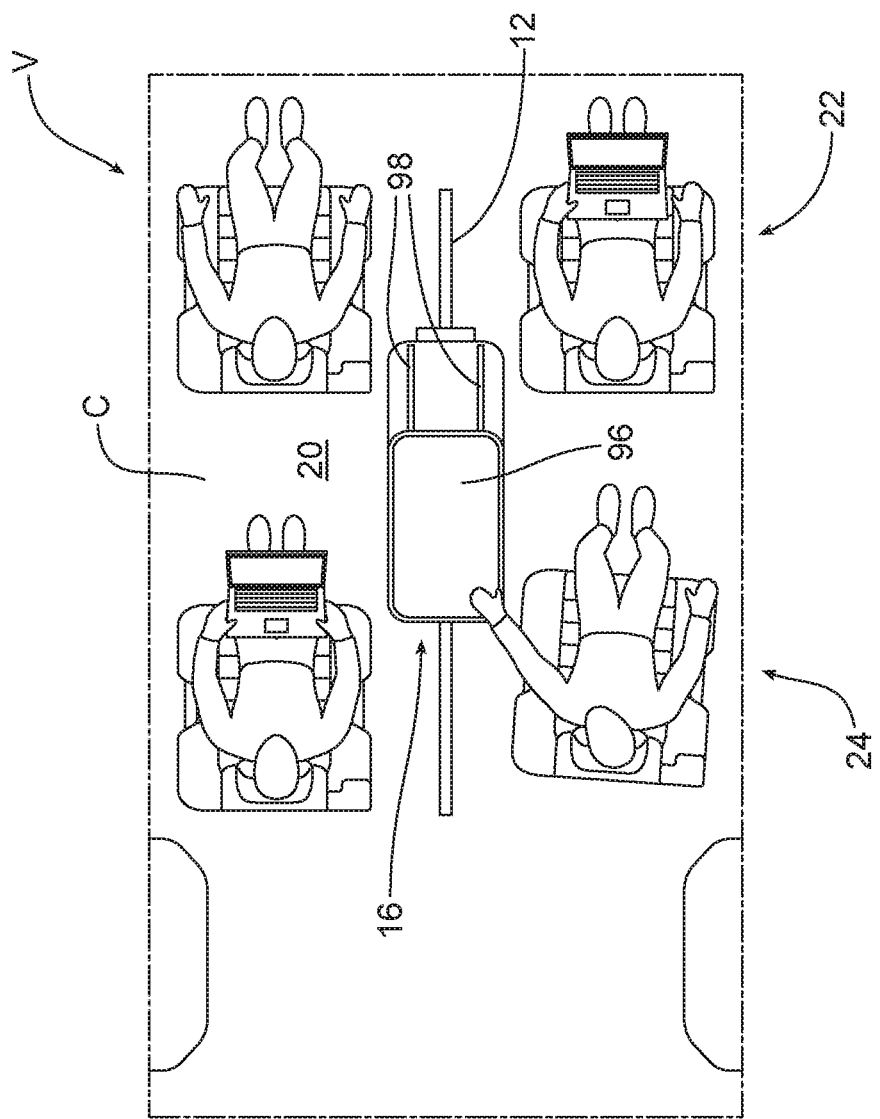

FIG. 12 is another top plan view of the passenger cabin of a motor vehicle wherein the storage seating module is in an intermediate position between the first row of seating and the second row of seating and configured to provide a raised table top.

Figure 13:
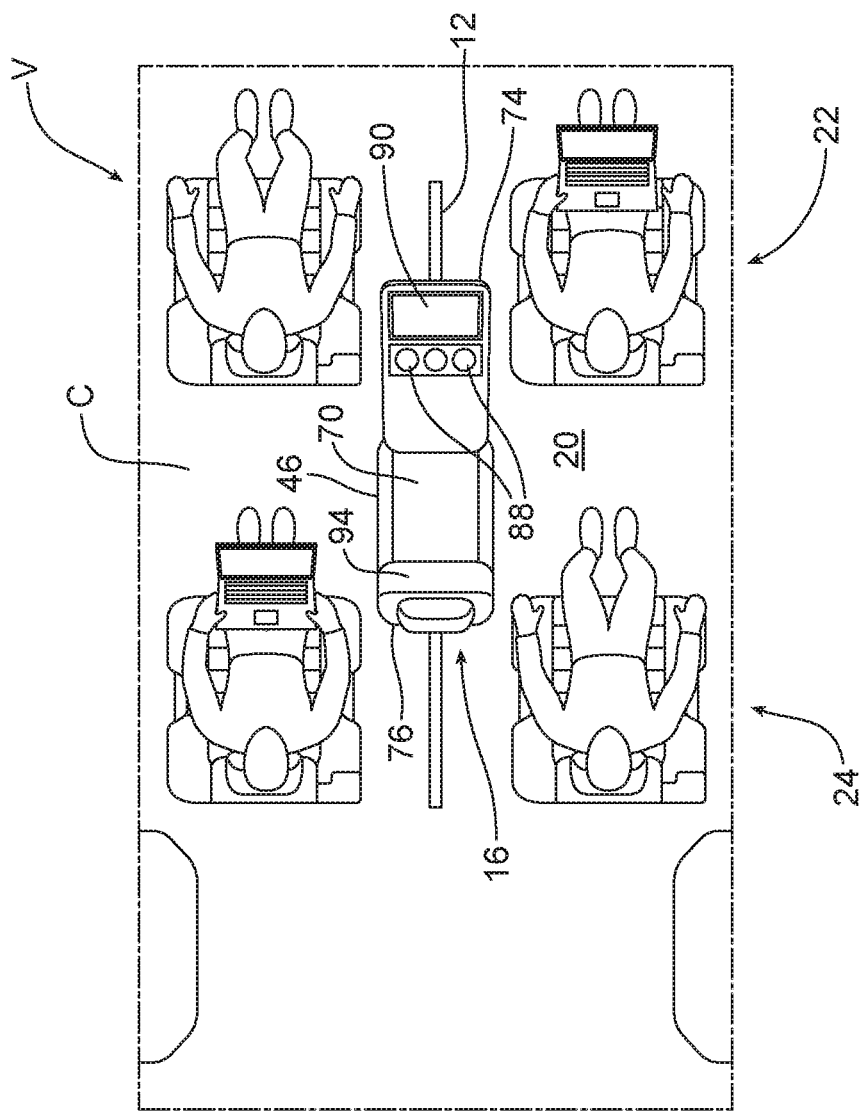

FIG. 13 is a top plan view of the passenger cabin of a motor vehicle wherein the storage and seating module is provided in an intermediate position between the first seating row and second seating row and configured to allow access to a storage compartment in the base of the storage and seating module.

Figure 14:
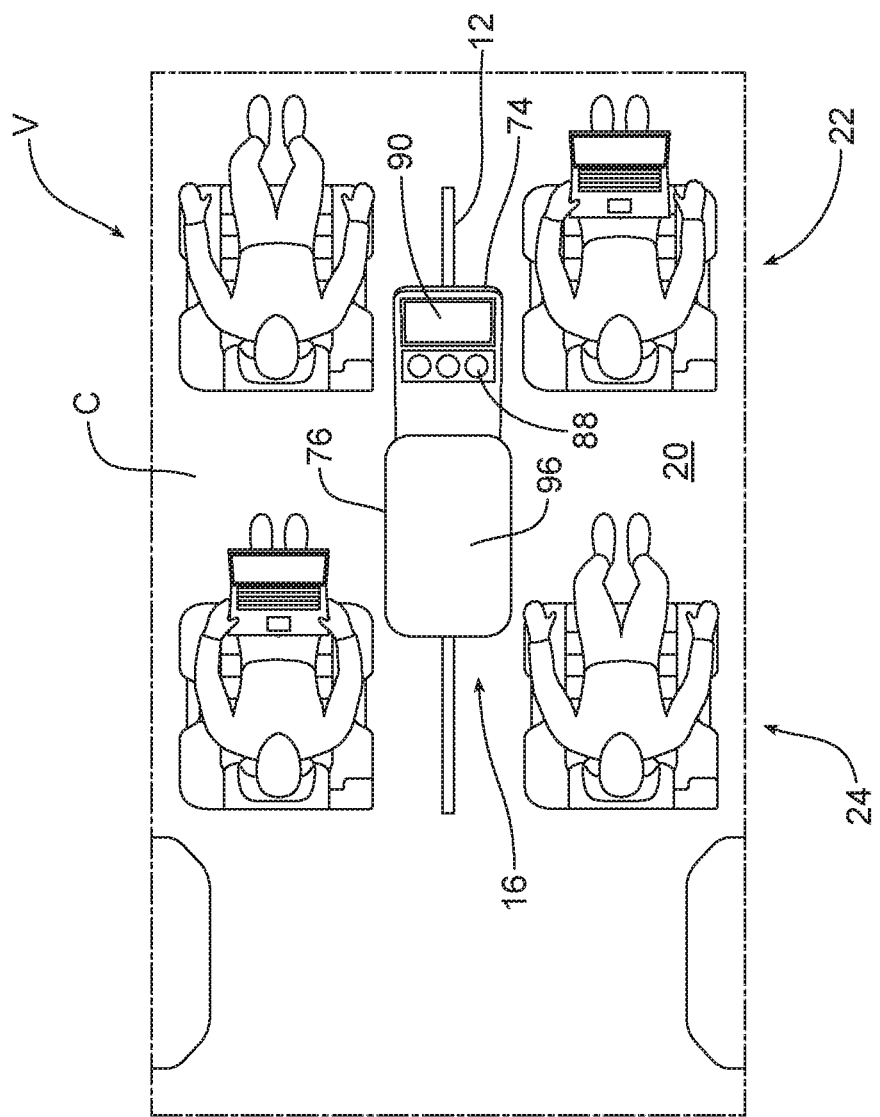

FIG. 14 is a view similar to FIG. 13 wherein the storage and seating module has been reconfigured to close the storage compartment and provide a table top beneath and rearward of the cup holders and view screen.

Figure 15:
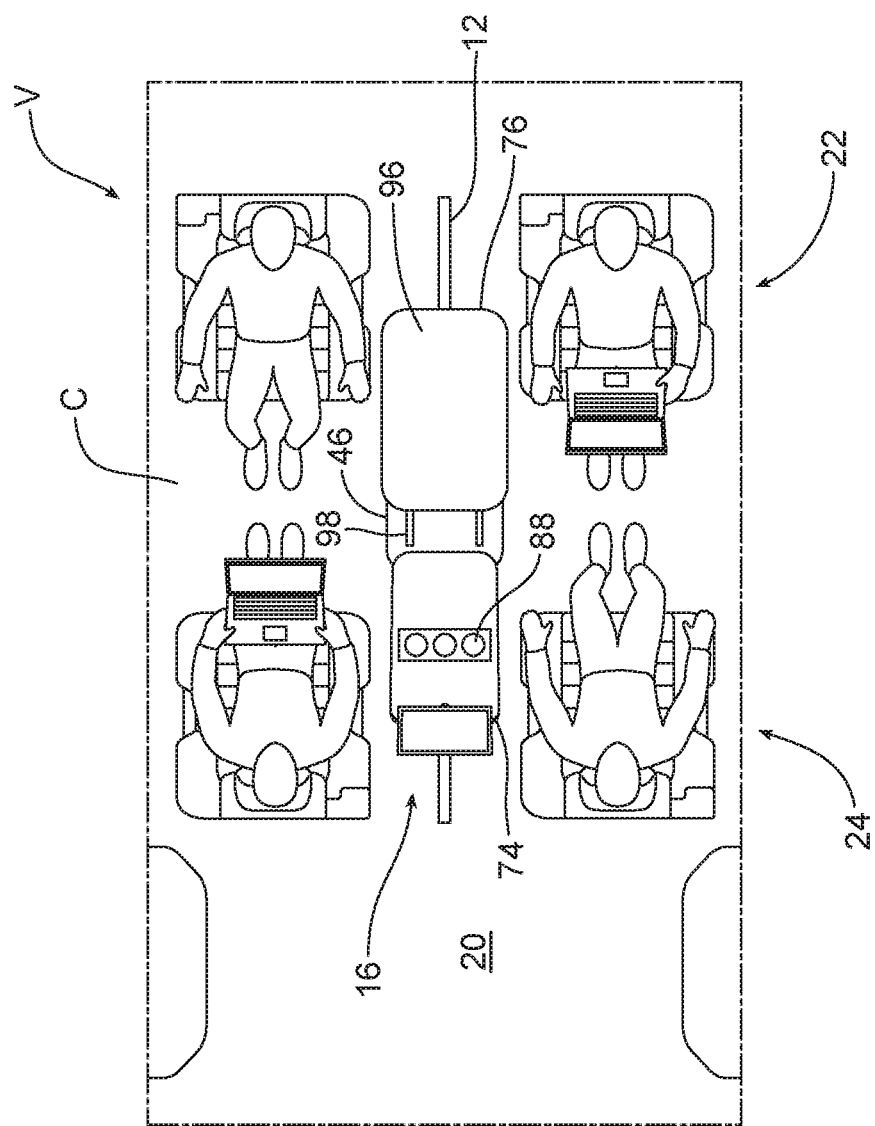

FIG. 15 is a top plan view of the passenger compartment of the motor vehicle wherein the forward row of seats have been reoriented to face motor vehicle rearward and the storage and seating module has been reoriented 180 degrees so that the cup holders and view screen are now motor vehicle rearward of the extended table and face toward the passengers in the first seating row.

Figure 16:
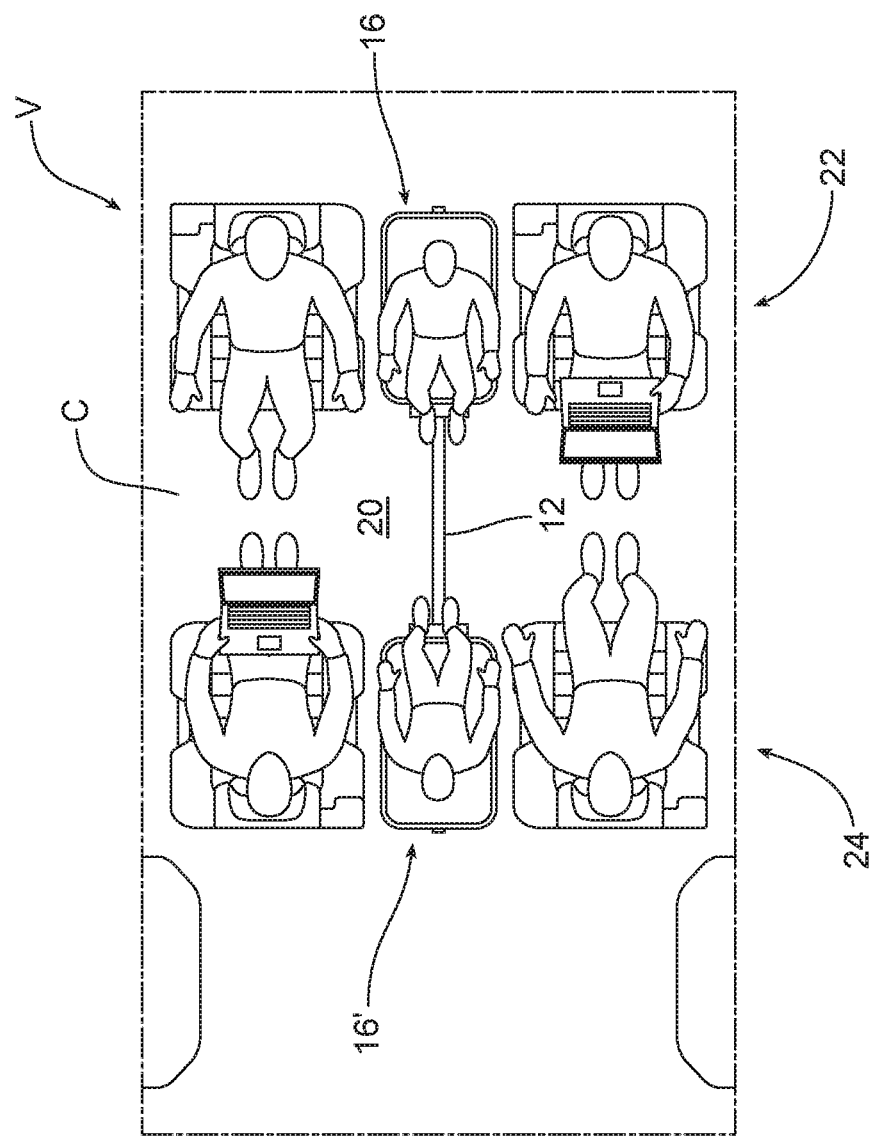

FIG. 16 is a top plan view of the passenger compartment of the motor vehicle wherein the apparatus comprises two storage and seating modules on the same track with the first module positioned in the first row of seating in a seating position facing motor vehicle rearward and the second module positioned in the second row of seating in a seating position facing motor vehicle forward.

Reference will now be made in detail to the present preferred embodiments of the apparatus, examples of which are illustrated in the accompanying drawing figures.

DETAILED DESCRIPTION

Reference is now made to the drawing figures illustrating the new and improved apparatus 10 that incorporates a track 12 see (FIGS. 1A-1D), a carriage 14 (see FIG. 3) that is displaceable along the track, a storage and seating module 16 and a swivel, generally designated by reference numeral 18 (see FIGS. 5A-5D). The swivel is adapted to connect the storage and seating module 16 to the carriage 14. As will become apparent from the following description, the swivel 18 allows the storage and seating module 16 to be selectively oriented in a first position (see FIG. 4A) or a second position (see FIG. 4G) on the carriage 14.

As best illustrated in FIGS. 1A-1D and 6-16, the track 12 may be provided in or on the floor 20 in the passenger compartment C of the motor vehicle V. As illustrated in FIG. 6, the track 12 extends from a forward end of the motor vehicle V between a first row of seating 22 rearwardly between a second row of seating 24 and rearwardly thereof into a cargo area 26 behind the second row of seating. In contrast, in the embodiments illustrated in FIGS. 8-16, the track 12 simply extends the length of the passenger compartment C from between the first row of seating 22 to between the second row of seating 24. As best illustrated in FIGS. 1A-1D, in the illustrated embodiment the track 12 comprises a U-shaped rail 28 having a central channel 30.

Reference is now made to FIGS. 3, 4A-4G and 5A-5D which best illustrate the carriage 14. As illustrated, the carriage 14 comprises (a) a body, including a guide block 32 adapted to be received in the channel 30 and slide along the rail 28, and (b) a support leg 34 at each corner 36. Guide block 32 may be made from a low friction material such as nylon.

Each support leg 34 may include a wheel or low friction slide 38 engaging upon the floor 20 of the motor vehicle V. In addition, the carriage 14 includes a plurality of locking pin receivers 40: one at each corner 36. The locking pin receivers 40 are provided on the upper face of the carriage 14 opposite the support legs 34. As will become apparent from the following description, the locking pin receivers 40 receive the plurality of locking pins 44 on the base 46 of the storage and seating module 16. A latching feature 48, of a type known in the art, may be provided to lock the locking pins 44 in the locking pin receivers 40 and thereby secure the storage and seating module 16 to the carriage 14. Similarly, a locking feature 50, of a type known in the art, may be provided to secure the carriage 14 at any desired position along the track 12. That locking feature 50 may comprise a pin, a friction brake or any other appropriate device suitable for the intended purpose.

As best illustrated in FIGS. 5A-5D, the swivel 18 of the illustrated embodiment includes (a) a mounting post 52 and (b) a cam 54, concentrically received around the mounting post, carried on the carriage 14. In addition, the swivel 18 includes a post receiver 56 carried on the base 46 of the storage and seating module 16. In the illustrated embodiment, the post receiver 56 comprises an annular wall defining a cylindrically-shaped socket.

More particularly, as illustrated in FIGS. 5A-5D, the cam 54 includes a first finger 60 and a second finger 62 wherein the first finger and second finger are separated by 180 degrees. Further, the post receiver 56 includes a first finger receiver 64 and a second finger receiver 66 also located 180 degrees apart. As will be described in greater detail below, when the storage and seating module 16 is in the first position, the first finger 60 is received in the first finger receiver 64 and the second finger 62 is received in the second finger receiver 66. In contrast, when the storage and seating module 16 is in the second position, the first finger 60 is received in the second finger receiver 66 and the second finger 62 is received in the first finger receiver 64. When the storage and seating module 16 is being rotated or displaced between the first position and the second position, the storage and seating module is lifted upwardly on the mounting post 52 and rotated with the collar riding on the uppermost rounded ends 68 of the first and second fingers 60, 62 (see FIG. 5B). Once the storage and seating module 16 has reached the selected first or second position, the first and second fingers 60, 62 are again aligned with the first and second finger receivers 64, 66 and the storage and seating module 16 may be displaced downward with respect to the carriage 14 until the first and second fingers 60, 62 are fully nested in the first and second finger receivers 64, 66. In this fully seated position, further rotation of the storage and seating module 16 with respect to the carriage 14 is prevented.

Reference is now made to FIGS. 1A-1G illustrating various different configurations for the storage seating module 16. More particularly, as noted above, the storage and seating module 16 includes a base 46 having an internal storage compartment 70. Further, the storage and seating module 16 includes a configurable feature, generally designated by reference numeral 72, that is carried on the base 46. More particularly, in the illustrated embodiment, the configurable feature 72 includes a first section 74 and a second section 76. More particularly, the first section 74 is connected by a first pivot 78 to a first end 80 of the base 46 and the second section 76 is connected by a second pivot 82 to a second end 84 of the base 46.

Figure 1A:
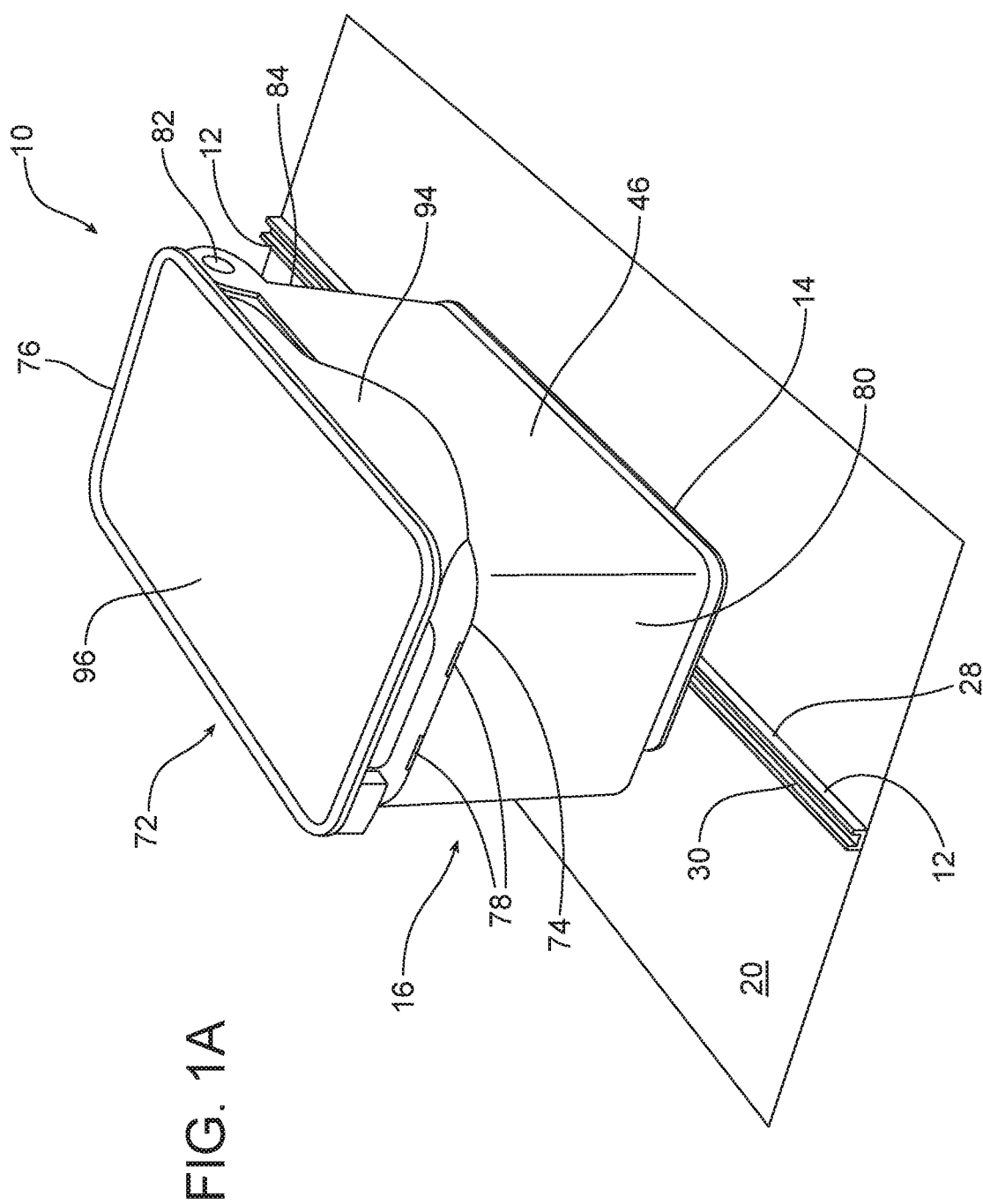
FIG. 1A is a detailed perspective view of the storage and seating module of the new and improved apparatus illustrating the storage and seating module in a first configuration providing a table top work surface.
Figure 1D:
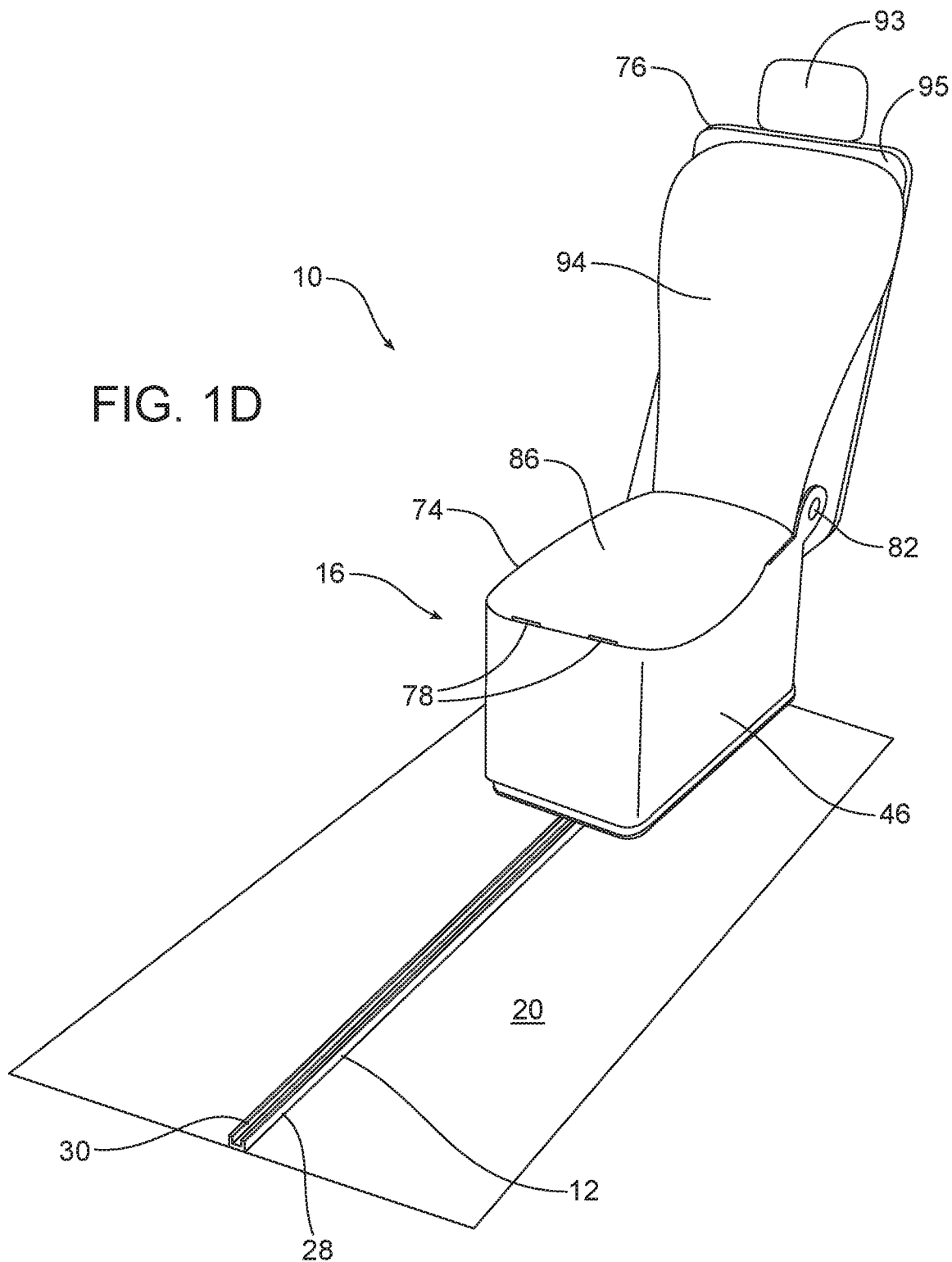
FIG. 1D is a view similar to FIG. 1C but illustrating the head rest for the seat in a raised position.
Figure 1E:
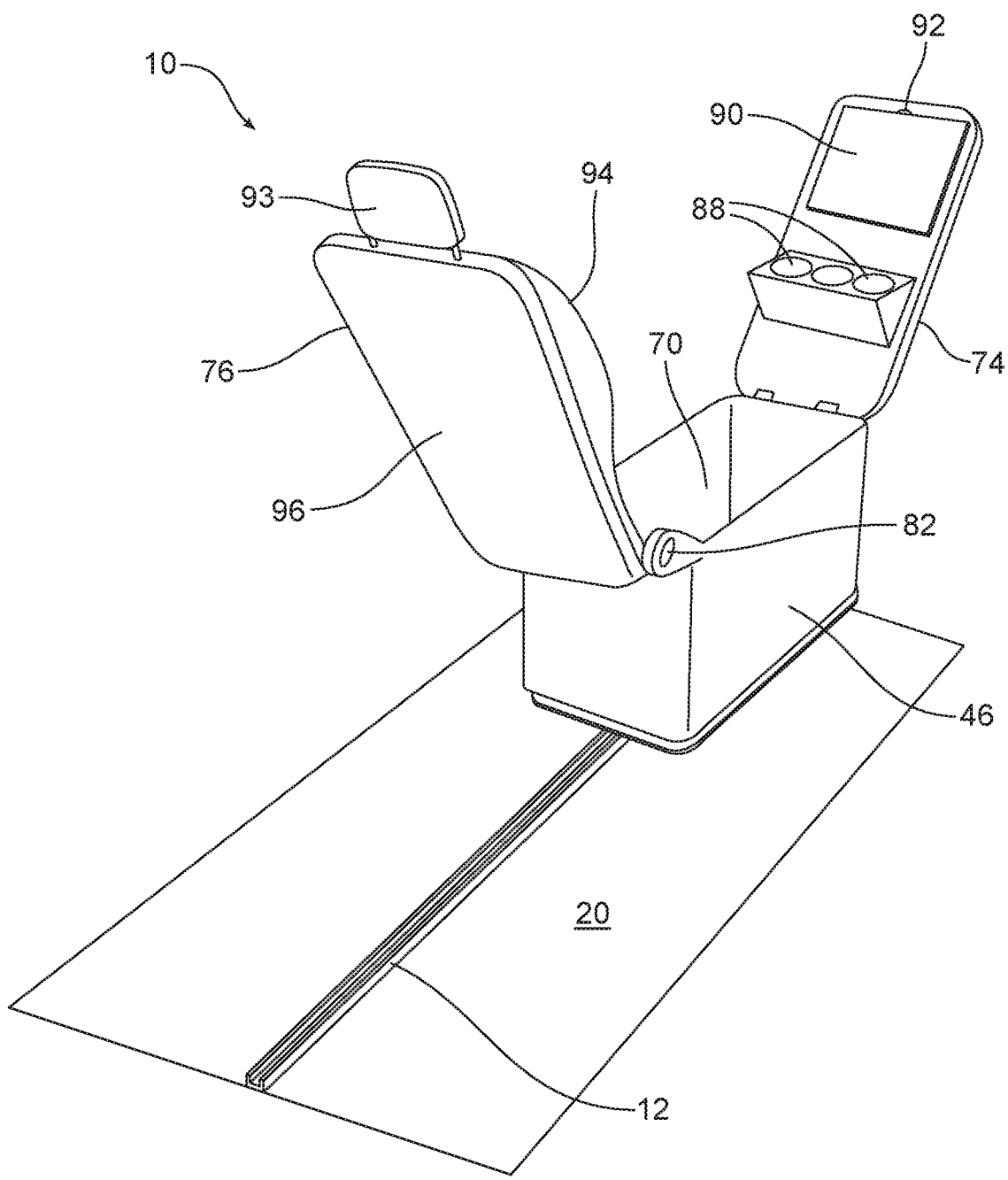
FIG. 1E is yet another perspective view of the storage and seating module in yet another configuration wherein first and second sections of the storage and seating module have been opened.
Figure 1F:
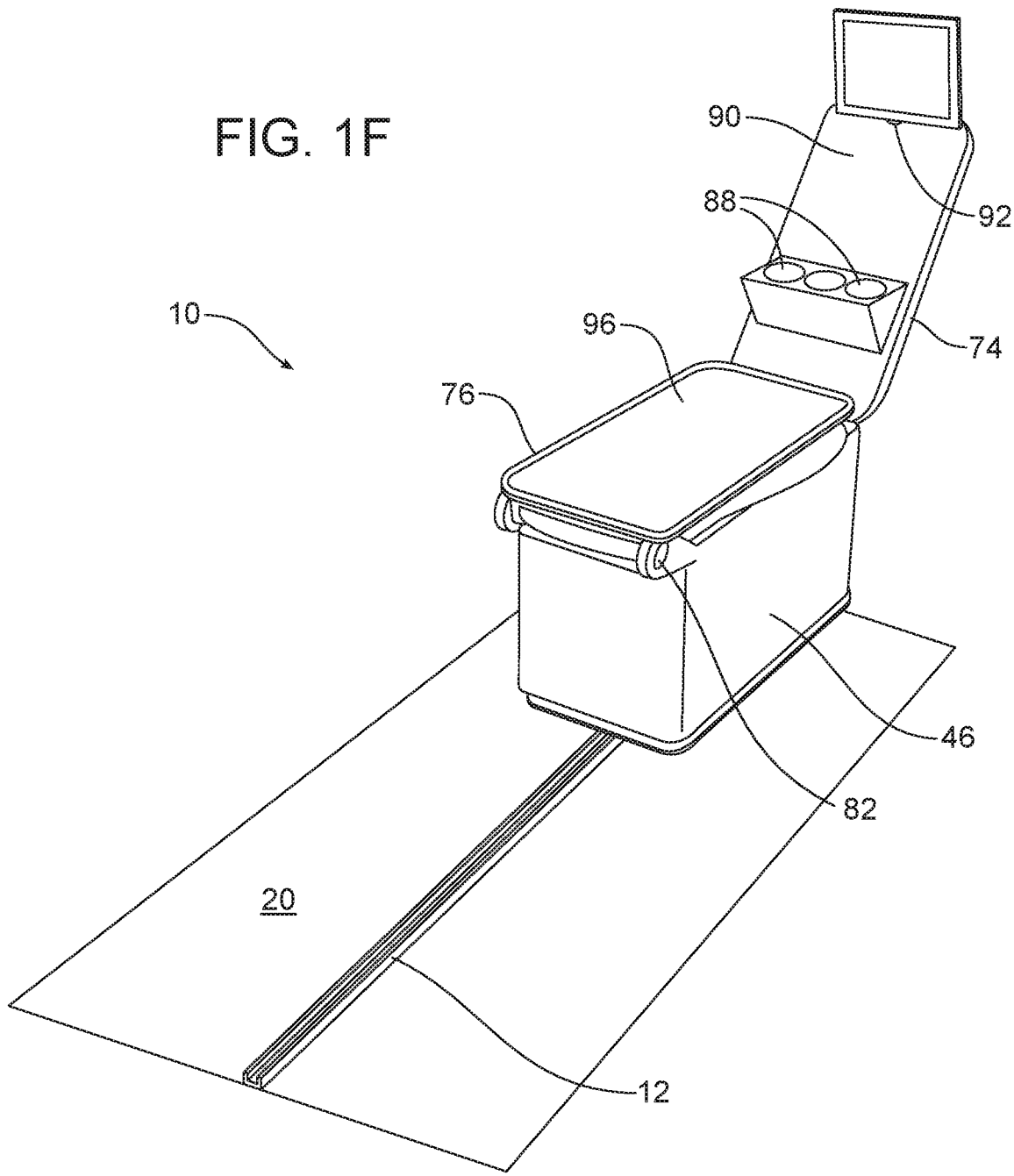
FIG. 1F is a view similar to FIG. 1E but now showing the first section pivoted open with the second section pivoted closed so as to provide a table top below a cup holder and view screen.
Figure 1G:
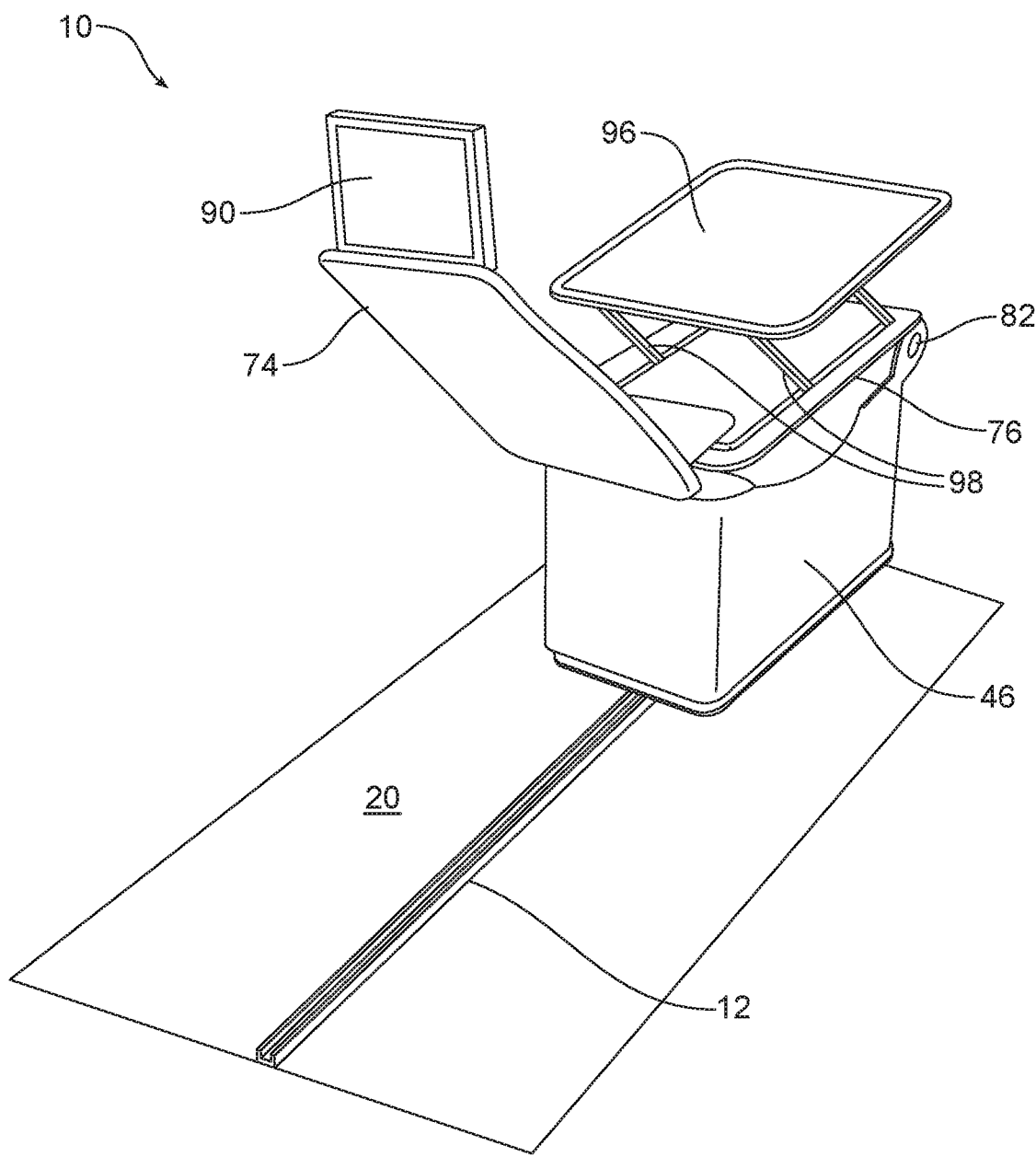
FIG. 1G is a view similar to FIG. 1F but illustrating the view screen pivoted upward and the table top in a raised position.

As best illustrated in FIGS. 1D-1F, the first section 74 includes a seat bottom cushion 86 on a first face and a cup holder 88 and view screen 90 on a second face opposite the first face. More particularly, the view screen 90 may be connected by a pivot 92 to the second face. The view screen 90 may be a two-sided view screen, a touch screen or any other similar device known in the art. View screen 90 may allow wireless connection to an information network such as the internet.

The second section 76 may include a headrest 93, a seat back cushion 94 on a first side of the panel 95 and a table top 96 on a second side of the panel.

The first section 74 is displaceable between a first home position overlying and closing the storage compartment 70 in the base 46 as illustrated, for example, in FIG. 1A and FIG. 1D and a first deployed position projecting upwardly from the first end 80 of the base 46 as illustrated, for example, in FIGS. 1E and 1F. Thus, as should be appreciated, the seat bottom cushion 86 is oriented upward from the base 46 when the first section 74 is in the first home position.

The second section 76 is displaceable between a second home position overlying and covering the base 46 as illustrated, for example, in FIGS. 1A and 1F and a second deployed position projecting upwardly from the second end 84 of the base 46 as illustrated, for example, in FIGS. 1D and 1E. As should be appreciated, the table top 96 is oriented upward when the second section 76 is in the second home position. As best illustrated in FIGS. 1A and 4A-4G, the second section 76 overlies the first section 74 when the first section is in the first home position and the second section is in the second home position.

In the illustrated embodiment, the table top 96 includes a linkage 98. In the illustrated embodiment, the linkage 98 comprises a four bar linkage. In a first or lowered position illustrated in FIG. 1A, the table top 96 assumes a flat configuration against the panel 95 directly overlying the base 46. In contrast, in a second or raised position illustrated in FIGS. 2A and 2B, the table top 96 is supported on the linkage 98 raised above the panel 95. A releasable lock of a type known in the art (not shown) is provided to lock the linkage 98 and hold the table top 96 in a raised position.

Figure 4B:
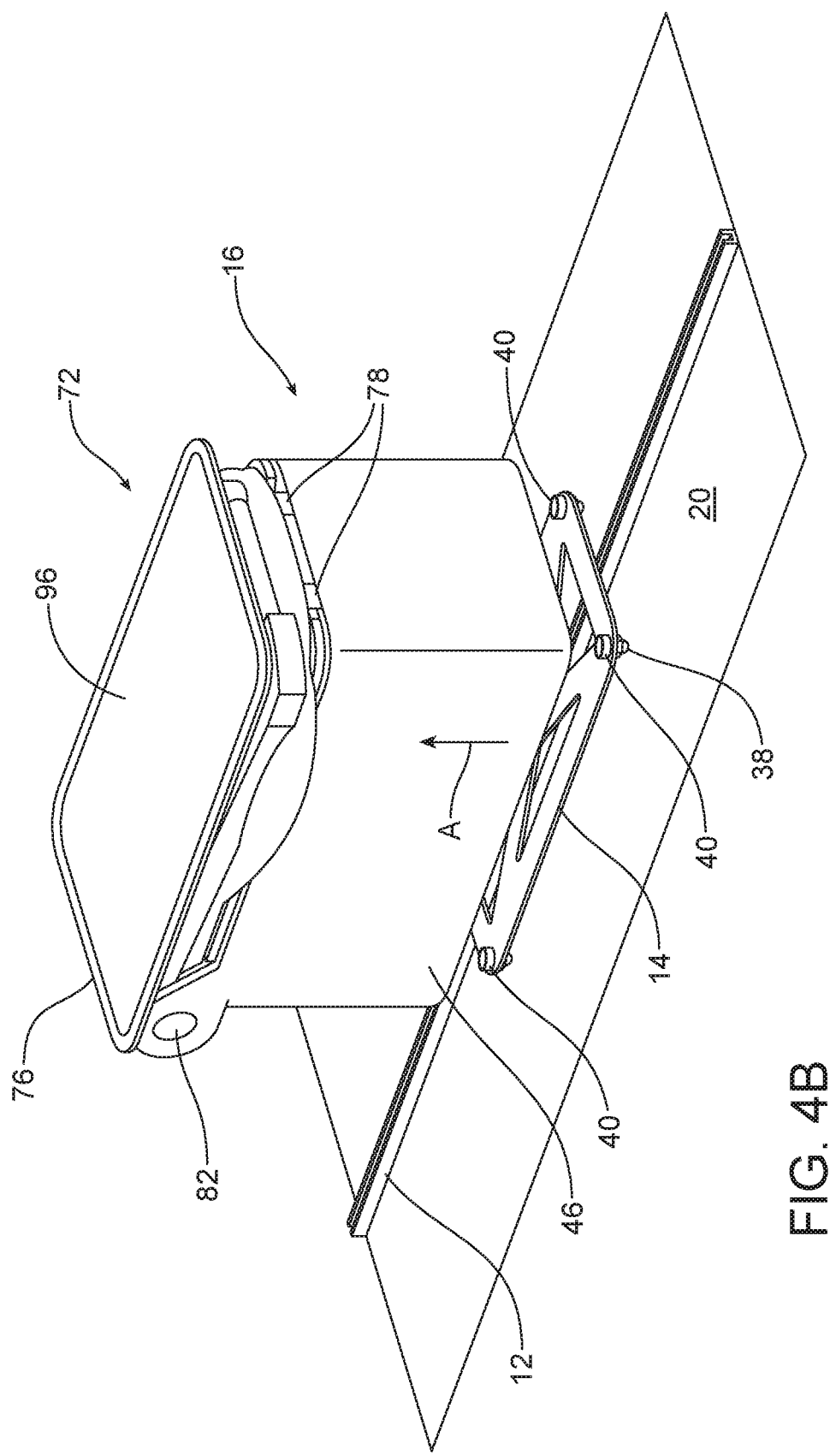
Figure 4C:
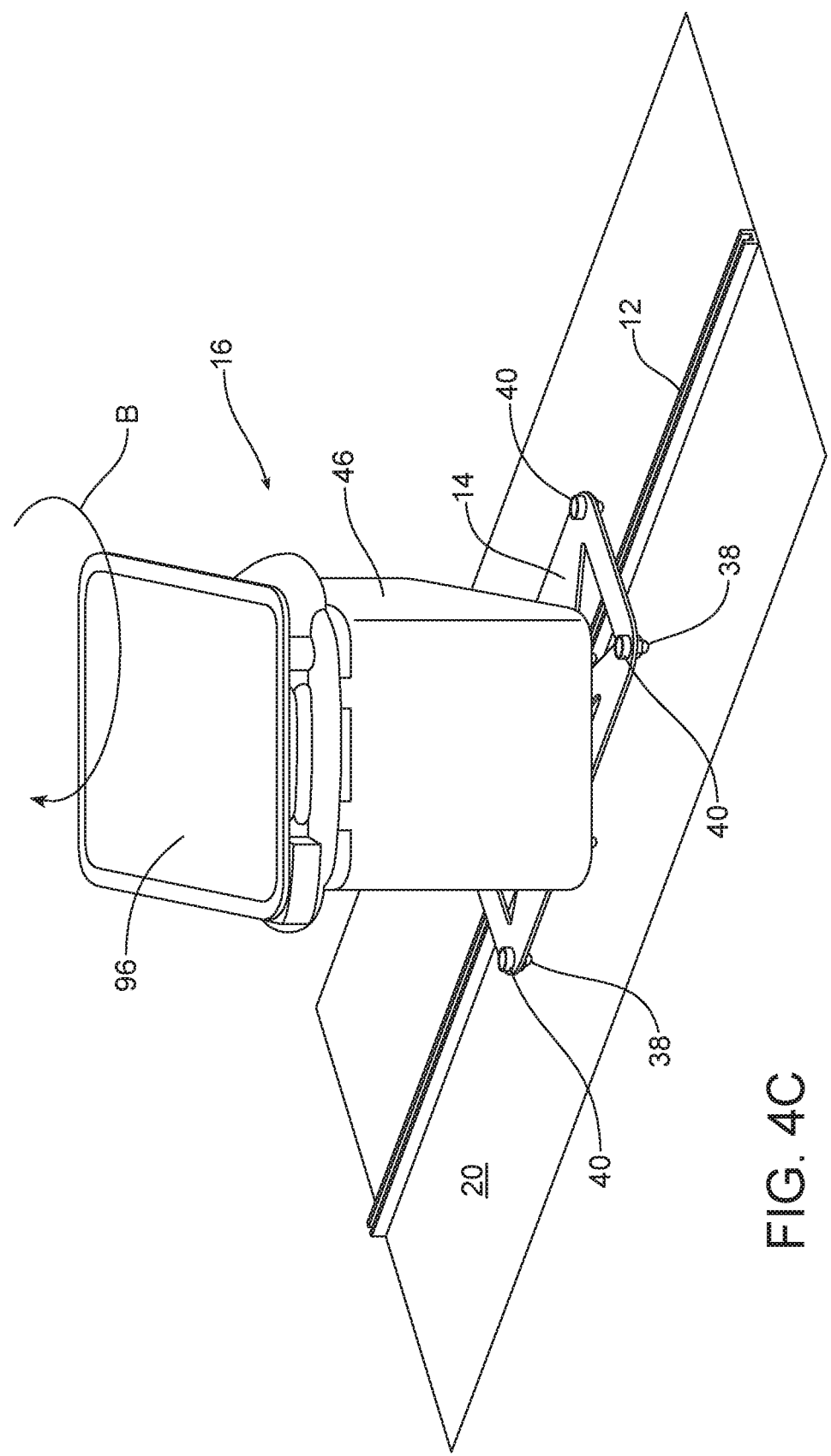
Figure 4D:
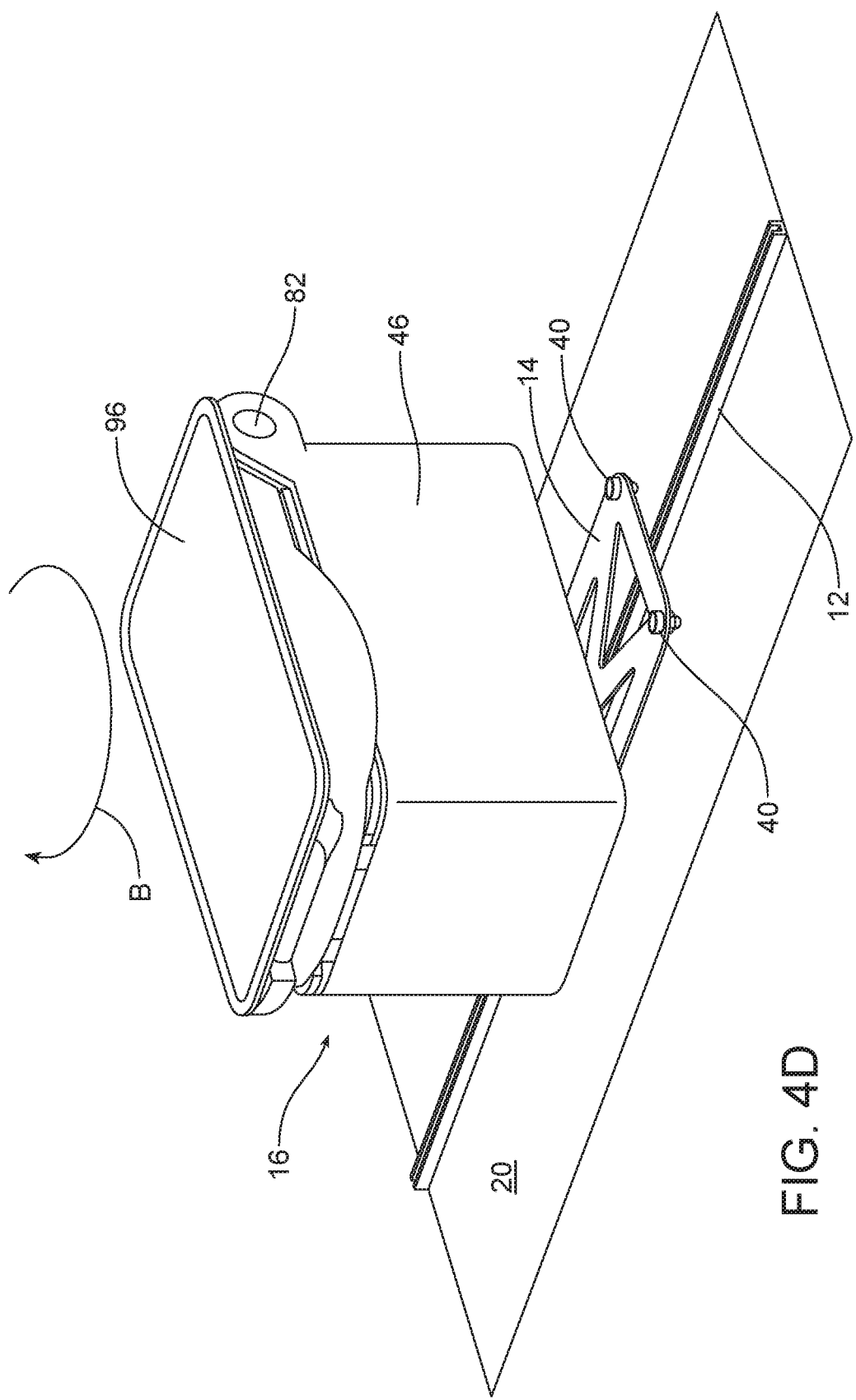
Figure 4E:
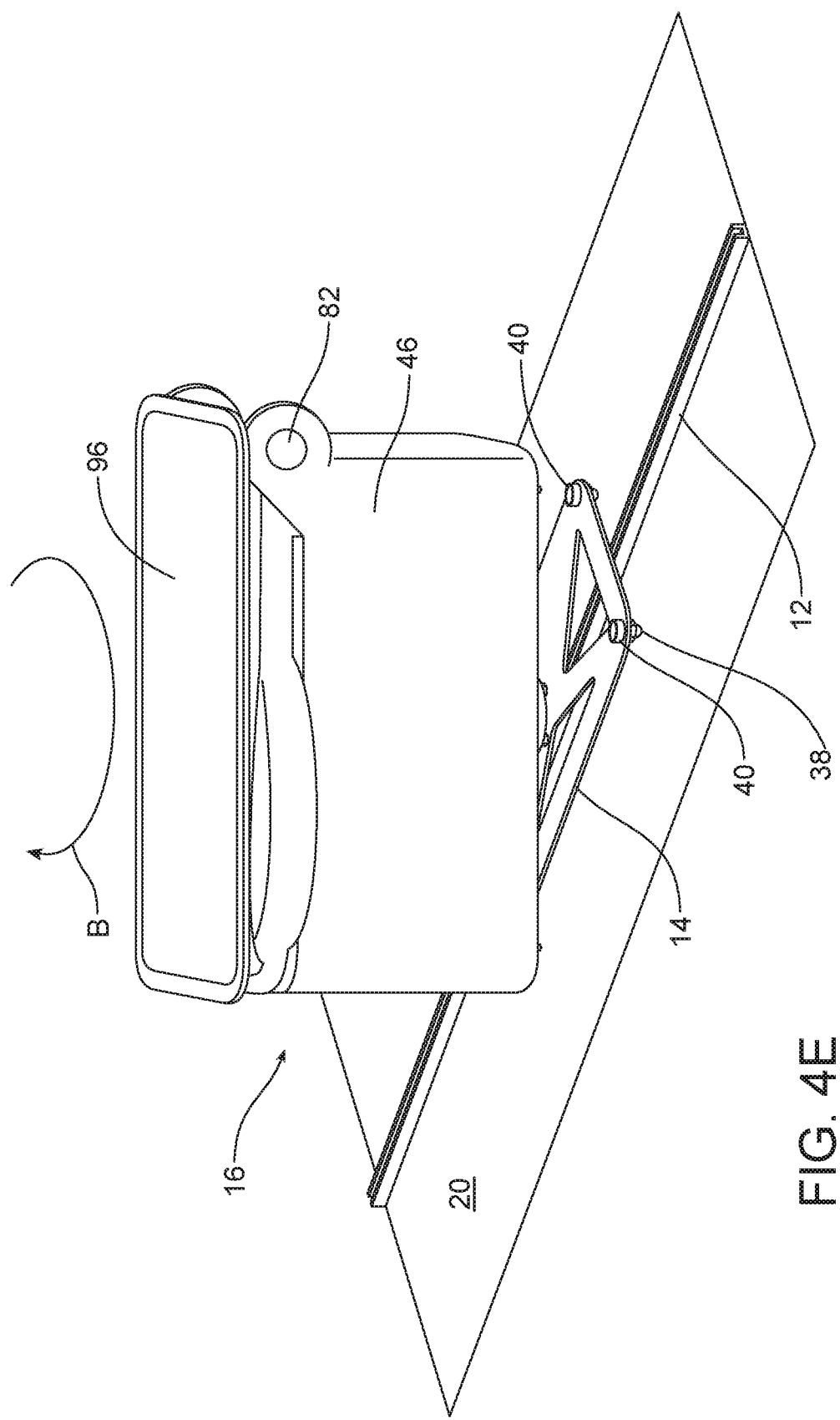

Reference is now made to FIGS. 4A-4G which, in combination with FIGS. 5A-5D, illustrate how the storage and seating module 16 is displaced by means of the swivel 18 between the first position and the second position on the underlying carriage 14. As illustrated in FIGS. 4A and 5A, initially one releases the latching feature 48 securing the locking pins 44 at the bottom of the base 46 to the locking pin receivers 40 carried on the carriage 14. Next, one lifts the storage and seating module 16 on the mounting post 52 in the direction of action arrow A until the locking pins 44 are free of the locking pin receivers 40 and the finger receivers 64 and 66 are free of the fingers 60, 62.

Next, as illustrated in FIGS. 4B-4E and FIG. 5B (FIG. 5B corresponds to FIG. 4D), the storage and seating module 16 is rotated in the direction of action arrow B on the mounting post 52 with respect to the carriage 14. As this is done, the ends 68 of the first and second fingers 60, 62 engage the mounting post receiver 56 and support the storage and seating module 16 in the raised position that allows for rotation. FIGS. 4F and 5C represent the moment when the storage and seating module 16 has reached the new position with the first and second fingers 60, 62 again being aligned with the first and second finger receivers 64, 66.

At this point, the storage and seating module 16 may be lowered back down onto the carriage 14 in the direction of action arrow D with the first and second fingers 60, 62 again engaged and fully nested in the first and second finger receivers 64, 66. This nesting of the fingers 60, 62 in the finger receivers 64, 66 prevents further rotation of the storage and seating module 16 on the carriage 14 thereby maintaining the storage and seating module and carriage in the properly aligned and seated position (see FIGS. 4G and 5D). As the storage and seating module 16 is once again lowered on the carriage 14, the locking pins 44 on the base 46 again engage in the locking pin receivers 40 on the carriage 14. Once fully and properly seated, the latching feature 48 may again be activated to lock the storage and seating module 16 in the properly seated position on the carriage 14.

As should be appreciated, the swivel movement of the storage and seating module 16 on the carriage 14 allows the storage and seating module to be oriented in a forward or rearward facing position for substantially any of the possible configurations the storage and seating module may assume.

Reference is now made to FIGS. 6-16 illustrating various different configurations for the storage and seating module.

As illustrated in FIG. 6, the storage and seating module 16 is in the fully collapsed position with the first section 74 in the first home position and the second section 76 in the second home position. As illustrated, the open top of the base 46 allowing access to the internal storage compartment 70 is closed and the table top 96 is oriented upwardly in a lowered position. As further illustrated in FIG. 6, the storage and seating module 16 is positioned on an intermediate portion of the track 12 staggered just slightly forward of the second row of seats 24 where the table top 96 may be conveniently utilized by one of the rear seat occupants O.

FIG. 7 is a view similar to FIG. 6 except that the storage and seating module 16 has been moved forward along the track 12 into a position resting between the first row of seating 22. This opens the space between the seats in the second row of seating 24 allowing one to freely ingress from a side door opening 100 and walk between the second row of seats to a seating position in the third row 102. Note action arrow E.

As illustrated in FIG. 8, the storage and seating module 16 has been configured into a seating configuration. Further, the storage and seating module 16 has been positioned between the seats of the second row of seating 24 to provide a third seating position in the middle of the second row of seating.

FIG. 9 is a view similar to FIG. 8 except that the storage and seating module 16 has now been positioned between the seats in the first row of seating 22 so as to provide a third or middle seat in that first row. Note in FIG. 9 that all of the seats in the first row of seating 22 including the seat formed by the storage and seating module 16 are oriented motor vehicle forward.

In FIG. 10, the storage and seating module is once again configured for seating. Further, the storage and seating module 16 is once again positioned in between the seats of the first row of seating 22 to provide a third or middle seating position within that row. As further illustrated in FIG. 10, the storage and seating module 16 has been rotated by means of the swivel 18 so that the storage and seating module provides a seat position that is oriented motor vehicle rearward. As further shown in the illustrated embodiment, the standard seats of the first row of seating 22 have also been oriented motor vehicle rearward.

As illustrated in FIG. 11, the storage and seating module 16 is once again in a seating configuration. However, the storage and seating module 16 has been positioned in a third seating position intermediate the first row of seating 22 and the second row of seating 24. This third seating position intermediate the first and second rows of seating 22, 24 provides the occupation of the seat formed by the storage and seating module 16 with greater shoulder room and thereby provides for a more comfortable ride for that occupant as well as the other occupants of the motor vehicle.

Figure 2B:
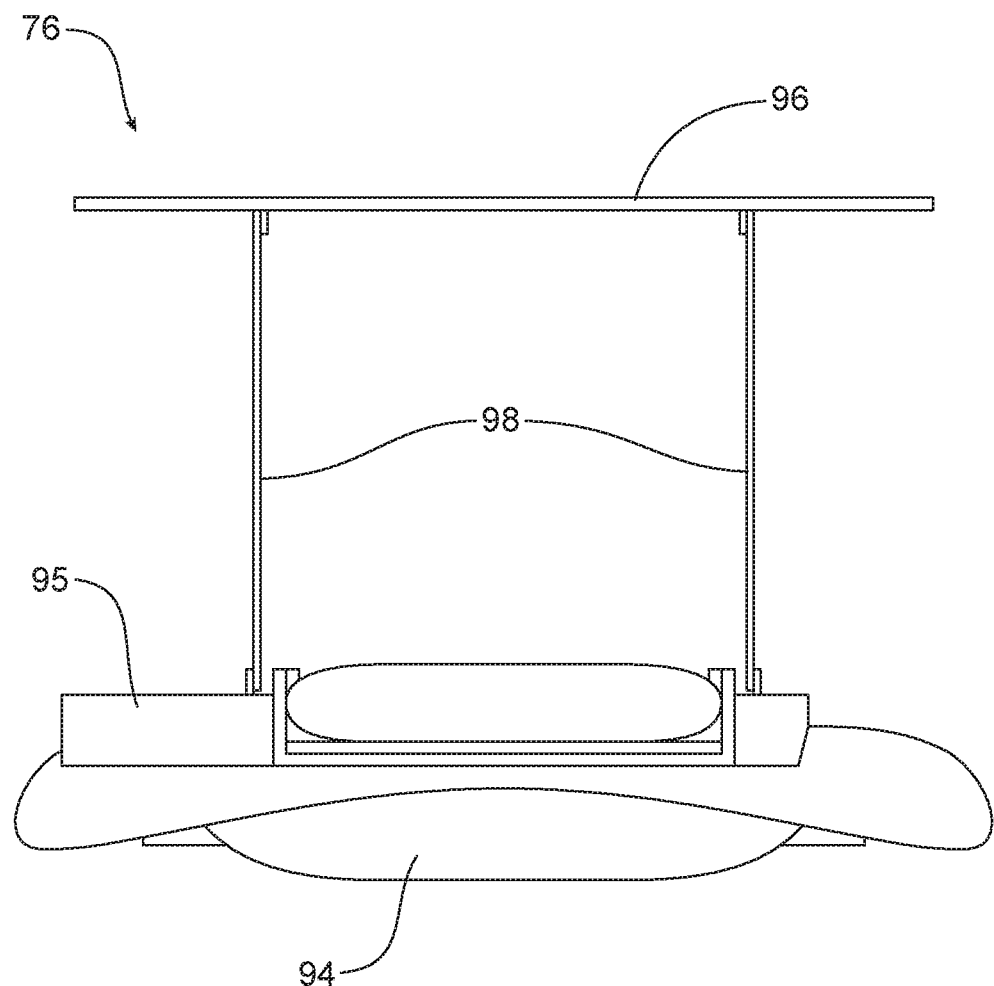

As illustrated in FIG. 12, the storage and seating module 16 is once again provided in an intermediate position between the first row of seating 22 and the second row of seating 24. However, in FIG. 12, the storage and seating module 16 has been reconfigured with the first section 74 in the first home position and the second section 76 in the second home position and the exposed table top 96 in the raised position on the linkage 98 as illustrated in FIGS. 2A and 2B.

In FIG. 13, the storage and seating module 16 is once again in the intermediate position between the first row of seating 22 and the second row of seating 24. However, as illustrated, the first section 74 is in the first deployed position and the second section 76 is in the second deployed position. This provides open top access to the storage compartment 70 in the base 46. It also allows easy access to the cup holder 88 and easy visualization of the view screen 90.

Reference is now made to FIG. 14 which again illustrates the storage and seating module 16 in the intermediate position between the first row of seating 22 and the second row of seating 24. In this illustration, the first section 74 is in the first deployed position while the second section 76 is in the second home position. Thus, the cup holder 88 and view screen 90 are exposed for use while the storage compartment 70 in the base 46 is closed and the table top 96 is exposed for use. As further illustrated in FIG. 14, it should be appreciated that the storage and seating module 16 is oriented so that the cup holder 88 and view screen 90 on the first section 74 are motor vehicle forward of the table top 96 of the second section 76.

As illustrated in FIG. 15, the storage and seating module is once again in the intermediate position between the first row of seating 22 and the second row of seating 24. The first section 74 is again in the first deployed position, exposing the cup holder 88 and the view screen 90 while the second section 76 is once again in the second home position exposing the table top 96. In this figure the table top 96 is once again raised as illustrated in FIGS. 2A and 2B. Further, it should be appreciated from comparing FIG. 15 to FIG. 14, the storage and seating module 16 has been reoriented 180 degrees so that the cup holder 88 and view screen 90 are motor vehicle rearward of the table top 96. The view screen 90 is also raised up on the hinge 92.

In the embodiment illustrated in FIG. 16, two storage and seating modules 16, 16' have been provided on the same track 12. As illustrated, the first storage and seating module 16 is provided in a rearward facing seating configuration in the first row of seating 22 and the second storage and seating module 16' is provided in a forward facing seating configuration within the second row of seating 24.

As should be appreciated from the foregoing description, the apparatus 10 incorporates a storage and seating module 16 that may be configured into a great many different seating, storage and work processing configurations. Advantageously, those configurations may be oriented in a motor vehicle forward or oriented in a motor vehicle rearward direction by means of the swivel 18 that connects the storage and seating module 16 to the underlying carriage 14 that rides or travels along the track 12. Further, the carriage 14 and track 12 function to allow the storage and seating module to be provided in various places at the front end, rear end or intermediate portion of the passenger compartment or cabin C of the motor vehicle V. Advantageously, the apparatus 10 allows tremendous flexibility and versatility by allowing the apparatus 10 to be configured for efficient and effective use for a wide range of applications thereby enhancing the utility and comfort of the passenger compartment C of the motor vehicle V.

The foregoing has been presented for purposes of illustration and description. It is not intended to be exhaustive or to limit the embodiments to the precise form disclosed. Obvious modifications and variations are possible in light of the above teachings. For example, the guide block 32 that is received in and travels along the channel 30 of the rail 28 may be replaced by a series of rollers or roller bearings that allow free sliding movement of the carriage 14 (and the storage and seating module 16 carried thereon) along the track 12 when the locking feature 50 is in the unlocked condition. All such modifications and variations are within the scope of the appended claims when interpreted in accordance with the breadth to which they are fairly, legally and equitably entitled.

What is claimed:

1. An apparatus, comprising:
   a track;
   a carriage displaceable along said track, said carriage including a plurality of locking pin receivers;
   a storage and seating module including a plurality of locking pins; and
   a swivel connecting said storage and seating module to said carriage, whereby said storage and seating module may be selectively oriented in a first position or a second position on said carriage.

2. The apparatus of claim 1, wherein said storage and seating module includes a base having a storage compartment.

3. The apparatus of claim 2, wherein said storage and seating module includes a configurable feature carried on said base.

4. The apparatus of claim 3, wherein said configurable feature includes a first section and a second section.

5. The apparatus of claim 4, wherein said first section is connected by a first pivot to a first end of said base and said second section is connected by a second pivot to a second end of said base.

6. The apparatus of claim 5, wherein said first section includes a seat bottom cushion on a first face and a cup holder and a view screen on a second face.

7. The apparatus of claim 6, wherein said second section includes a seat back cushion on a first side and a table top on a second side.

8. The apparatus of claim 7, wherein said first section is displaceable between a first home position overlying and closing said storage compartment in said base and a first deployed position projecting upwardly from said first end of said base.

9. The apparatus of claim 8, wherein said seat bottom cushion is oriented upward from said base when said first section is in said first home position.

10. The apparatus of claim 9, wherein said second section is displaceable between a second home position overlying and covering said base and a second deployed position projecting upwardly from said second end of said base.

11. The apparatus of claim 10, wherein said table top is oriented upward when said second section is in said second home position.

12. The apparatus of claim 11, wherein said second section overlies said first section when said first section is in said first home position and said second section is in said second home position.

13. The apparatus of claim 12, wherein at least a portion of said table top is supported on a linkage and is displaceable between a lowered position and a raised position.

14. The apparatus of claim 13, wherein said linkage is a four bar linkage.

15. The apparatus of claim 12 wherein said view screen is connected by a hinge to said first section and is displaceable between a stored position and an extended position.

16. The apparatus of claim 1, further including a latching feature releasably securing said plurality of locking pins in said plurality of locking pin receivers and a locking feature securing said carriage in a selected position along said track.

17. An apparatus comprising:
    a track;
    a carriage displaceable along said track;
    a storage and seating module wherein said storage and seating module includes (a) a base having a storage compartment and (b) a configurable feature carried on said base, said configurable feature including a first section and a second section wherein said first section is connected by a first pivot to a first end of said base and said second section is connected by a second pivot to a second end of said base; and
    a swivel connecting said storage and seating module to said carriage, whereby said storage and seating module may be selectively oriented in a first position or a second position on said carriage.

18. An apparatus, comprising:
    a track;
    a carriage displaceable along said track;
    a storage and seating module; and
    a swivel connecting said storage and seating module to said carriage, whereby said storage and seating module may be selectively oriented in a first position or a second position on said carriage wherein said track has a first end in a first row of seating in a motor vehicle and a second end in a second row of seating in said motor vehicle and said storage and seating module is selectively displaceable between a first seating position in said first row of seating, a second seating position in said second row of seating and a third seating position intermediate said first row of seating and said second row of seating.

19. The apparatus of claim 18, wherein said swivel includes (a) a mounting post and a cam carried on said carriage and (b) a post receiver carried on said base.

20. The apparatus of claim 19, wherein said cam includes a first finger and a second finger and said post receiver includes a first finger receiver and a second finger receiver, wherein (a) said first finger is received in said first finger receiver and said second finger is received in said second finger receiver when said storage and seating module is in said first position and (b) said first finger is received in said second finger receiver and said second finger is received in said first finger receiver when said storage and seating module is in said second position.

\* \* \* \* \*